(12) United States Patent
Kusashima et al.

(10) Patent No.: US 11,575,473 B2
(45) Date of Patent: Feb. 7, 2023

(54) WIRELESS COMMUNICATION DEVICE, WIRELESS COMMUNICATION METHOD, AND COMPUTER PROGRAM FOR UPLINK CONTROL SIGNALS BASED ON CHANNEL SENSING

(71) Applicant: Sony Corporation, Tokyo (JP)

(72) Inventors: Naoki Kusashima, Tokyo (JP); Hiromasa Uchiyama, Tokyo (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 17/260,577

(22) PCT Filed: Aug. 2, 2019

(86) PCT No.: PCT/JP2019/030616
§ 371 (c)(1),
(2) Date: Jan. 15, 2021

(87) PCT Pub. No.: WO2020/031926
PCT Pub. Date: Feb. 13, 2020

(65) Prior Publication Data
US 2021/0266111 A1 Aug. 26, 2021

(30) Foreign Application Priority Data
Aug. 9, 2018 (JP) .............................. JP2018-150338

(51) Int. Cl.
*H04L 1/18* (2006.01)
*H04W 72/04* (2009.01)
*H04W 74/08* (2009.01)

(52) U.S. Cl.
CPC .......... *H04L 1/1819* (2013.01); *H04L 1/1896* (2013.01); *H04W 72/042* (2013.01);
(Continued)

(58) Field of Classification Search
CPC .. H04L 1/1819; H04L 1/1896; H04W 72/042; H04W 72/0453; H04W 74/0816
See application file for complete search history.

(56) References Cited

U.S. PATENT DOCUMENTS

2017/0142705 A1* 5/2017 Chendamarai Kannan ................. H04W 72/0413
2017/0272200 A1* 9/2017 Dinan ..................... H04L 1/001
(Continued)

FOREIGN PATENT DOCUMENTS

| WO | 2017/081799 A1 | 5/2017 |
| WO | 2018/123950 A1 | 7/2018 |
| WO | 2018/128086 A1 | 7/2018 |

OTHER PUBLICATIONS

International Search Report and Written Opinion dated Oct. 21, 2019, received for PCT Application PCT/JP2019/030616, Filed on Aug. 2, 2019, 9 pages including English Translation.
(Continued)

*Primary Examiner* — Jael M Ulysse
(74) *Attorney, Agent, or Firm* — Xsensus LLP

(57) ABSTRACT

There is provided a wireless communication device including a determination unit configured to determine whether a channel is clear or busy, and a transmission processing unit configured to transmit a hybrid ARQ (HARQ) to a communication device of a communication partner, in which the HARQ is transmitted using a first resource or a second resource, and in a case where transmission of the HARQ using the first resource has been failed through the determination by the carrier sense unit, the transmission processing unit transmits a HARQ using the second resource.

16 Claims, 33 Drawing Sheets

(52) U.S. Cl.
CPC ... *H04W 72/0446* (2013.01); *H04W 72/0453* (2013.01); *H04W 74/0816* (2013.01)

(56) References Cited

U.S. PATENT DOCUMENTS

| | | | |
|---|---|---|---|
| 2017/0359815 A1* | 12/2017 | Chendamarai Kannan | ................ H04L 5/0044 |
| 2018/0124612 A1* | 5/2018 | Babaei | .............. H04W 74/0833 |
| 2018/0279376 A1* | 9/2018 | Dinan | ............... H04W 74/0833 |
| 2019/0021097 A1* | 1/2019 | Li | ........................ H04L 1/1896 |
| 2019/0036831 A1* | 1/2019 | Li | ..................... H04W 74/0816 |
| 2019/0141696 A1* | 5/2019 | Kim | ................. H04W 72/0413 |
| 2019/0253200 A1* | 8/2019 | Salem | ................. H04W 72/042 |
| 2020/0351060 A1* | 11/2020 | Liang | ................... H04L 1/1848 |

OTHER PUBLICATIONS

Qualcomm Incorporated, "Study on NR-based Access to Unlicensed Spectrum", 3GPP TSG RAN Meeting #77, RP-172021, Sep. 11-14, 2017, 5 pages.

Huawei et al., "HARQ Enhancements in NR Unlicensed", 3GPP TSG RAN WG1 Meeting #93, R1-1805918, May 21-25, 2018, 7 pages.

* cited by examiner

FIG. 3

| SUBCARRIER SPACING SETTING μ | SUBCARRIER SPACING [kHz] | CYCLIC PREFIX | NUMBER OF SYMBOLS PER SLOT | NUMBER OF SLOTS PER RADIO FRAME | NUMBER OF SLOTS PER SUBFRAME |
|---|---|---|---|---|---|
| 0 | 15 | NORMAL CP | 14 | 10 | 1 |
| 1 | 30 | NORMAL CP | 14 | 20 | 2 |
| 2 | 60 | NORMAL CP | 14 | 40 | 4 |
| 2 | 60 | EXTENDED CP | 12 | 40 | 4 |
| 3 | 120 | NORMAL CP | 14 | 80 | 8 |
| 4 | 240 | NORMAL CP | 14 | 160 | 16 |

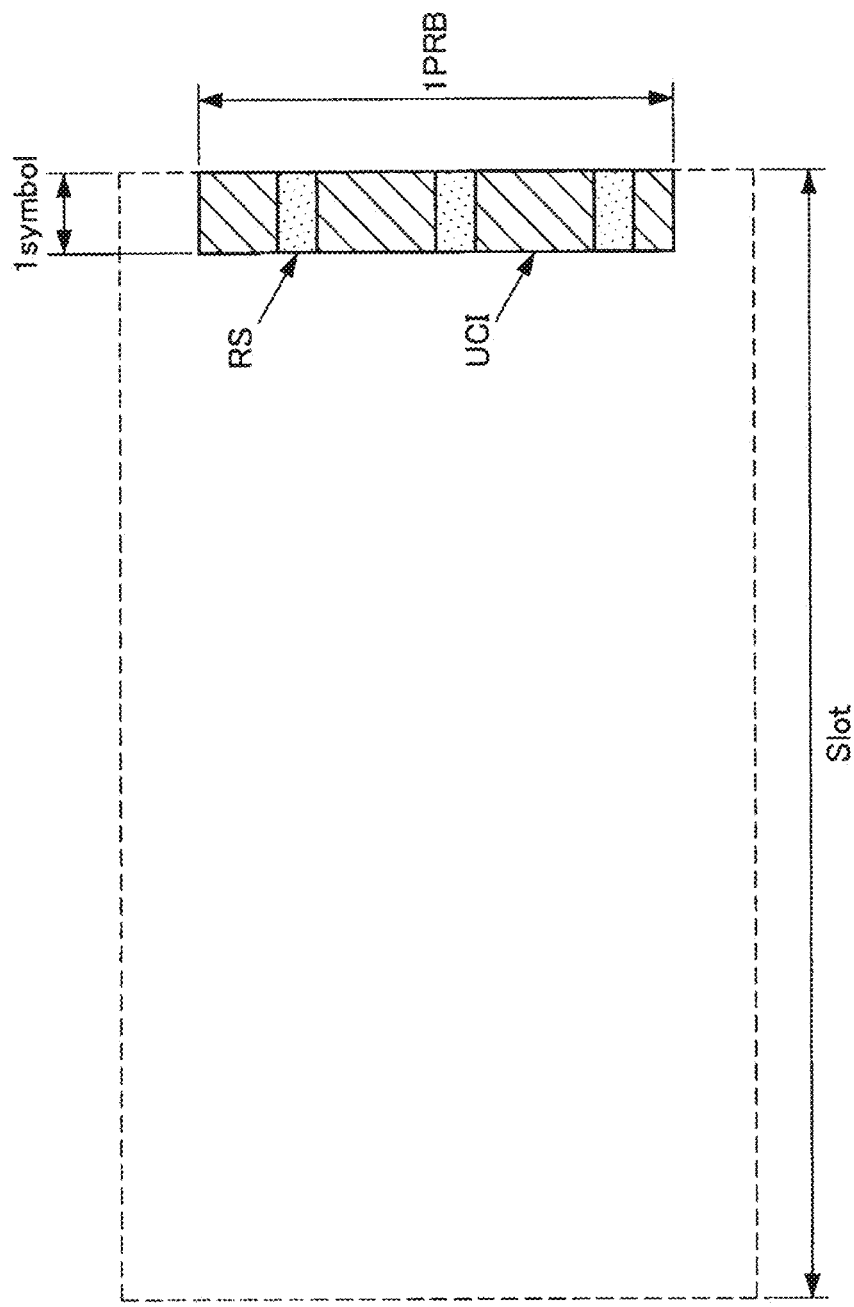

WIRELESS COMMUNICATION DEVICE, WIRELESS COMMUNICATION METHOD, AND COMPUTER PROGRAM FOR UPLINK CONTROL SIGNALS BASED ON CHANNEL SENSING

CROSS-REFERENCE TO RELATED APPLICATIONS

The present application is based on PCT filing PCT/JP2019/030616, filed Aug. 2, 2019, which claims priority to JP 2018-150338, filed Aug. 9, 2018, the entire contents of each are incorporated herein by reference.

TECHNICAL FIELD

The present disclosure relates to a wireless communication device, a wireless communication method, and a computer program.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), 5G, Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE, a base station device (base station) is also referred to as an evolved Node B (eNodeB), in NR, the base station device (base station) is also referred to as gNodeB, and in LTE and NR, a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and Ultra Reliable and Low Latency Communications (URLLC). NR is reviewed for the purpose of a technology framework corresponding to use scenarios, request conditions, placement scenarios, and the like in such use cases.

The operation and management of wireless access schemes based on cellular communication in unlicensed bands and license shared bands is being considered. In such unlicensed bands, coexistence with other nodes and wireless systems is important, and function such as Listen Before Talk (LBT), which senses the channel before transmitting, and discontinuous transmission are demanded for wireless access schemes such as LTE and NR. Details about a wireless access scheme based on NR in unlicensed bands are disclosed in Non-Patent Document 1. Note that the unlicensed bands are the 2.4 GHz band, the 5 GHz band, and the 6 GHz band, for example. The license shared bands are the 3.5 GHz band and the 37 GHz band, for example.

Typically, in spectrum shared by different operators such as an unlicensed band or a license shared band, transmission is performed in accordance with a concept referred to as Listen Before Talk (LBT) to maintain fairness in providing transmission opportunities. An operator refers to a telecommunications carrier having a network for mobile communication and providing mobile communication services. According to LBT, a transmission device performs carrier sensing before transmission to check whether the channel is idle, and transmits after obtaining channel access rights. From the perspective of channel fairness, in many cases the transmission device secures the channel when data to be transmitted is generated, and releases the channel when transmission ends after a fixed period.

CITATION LIST

Non-Patent Document

Non-Patent Document 1: RP-172021, "Study on NR-based Access to Unlicensed Spectrum," 3GPP TSG RAN Meeting #77, Sapporo, Japan, Sep. 11-14, 2017.

SUMMARY OF THE INVENTION

Problems to be Solved by the Invention

Basically, in an unlicensed band, a communication device performs LBT to sense the channel before transmission. However, depending on the result of LBT, the communication device may be unable to transmit. Consequently, necessary information does not arrive normally, which leads to instability in the wireless communication link.

Accordingly, the present disclosure proposes a novel and improved wireless communication device, wireless communication method, and computer program capable of making the wireless communication link more stable in a communication system using an unlicensed band.

Solutions to Problems

According to the present disclosure, there is provided a wireless communication device including a determination unit configured to determine whether a channel is clear or busy, and a transmission processing unit configured to transmit a Hybrid Automatic Repeat reQuest (HARQ) to a communication device of a communication partner, in which the HARQ is transmitted using a first resource or a second resource, and in a case where transmission of the HARQ using the first resource has been failed through the determination by the carrier sense unit, the transmission processing unit transmits a HARQ using the second resource.

Further, according to the present disclosure, there is provided a wireless communication device including a communication unit configured to receive a hybrid ARQ (HARQ) from a communication device of a communication partner, and a setting unit configured to set a resource to be used by the communication device to transmit the HARQ, in which in which the setting unit sets a first resource or a second resource as the resource for transmitting the HARQ, and the second resource is a resource which transmits a HARQ in a case where the communication device has failed in transmission of the HARQ using the first resource.

Further, according to the present disclosure, there is provided a wireless communication method including determining whether a channel is clear or busy, and transmitting a hybrid ARQ (HARQ) to a communication device of a communication partner, in which the HARQ is transmitted using a first resource or a second resource, and in a case where transmission of the HARQ using the first resource has been failed through the determination as to whether the channel is clear or busy, a HARQ is transmitted using the second resource.

Further, according to the present disclosure, there is provided a wireless communication method including setting a resource to be used by a communication device of a communication partner to transmit the HARQ, and receiving a hybrid ARQ (HARQ) from the communication device, in which a first resource or a second resource is set as the resource for transmitting the HARQ, and the second resource is a resource which transmits a HARQ in a case where the communication device has failed in transmission of the HARQ using the first resource.

Further, according to the present disclosure, there is provided a computer program for causing a computer to execute a process including determining whether a channel is clear or busy, and transmitting a hybrid ARQ (HARQ) to a communication device of a communication partner, in which the HARQ is transmitted using a first resource or a second resource, and in a case where transmission of the HARQ using the first resource has been failed through the determination as to whether the channel is clear or busy, a HARQ is transmitted using the second resource.

Further, according to the present disclosure, there is provided a computer program for causing a computer to execute a process including setting a resource to be used by a communication device of a communication partner to transmit a hybrid ARQ (HARQ), and receiving the HARQ from the communication device, in which a first resource or a second resource is set as the resource for transmitting the HARQ, and the second resource is a resource which transmits a HARQ in a case where the communication device has failed in transmission of the HARQ using the first resource.

Effects of the Invention

According to the present disclosure as described above, a novel and improved wireless communication device, wireless communication method, and computer program capable of making the wireless communication link more stable in a communication system using an unlicensed band can be provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a table for explaining a subcarrier spacing setting.

FIG. 6 is an explanatory diagram illustrating a configuration example of a PUCCH format 2.

MODE FOR CARRYING OUT THE INVENTION

Figure 1:
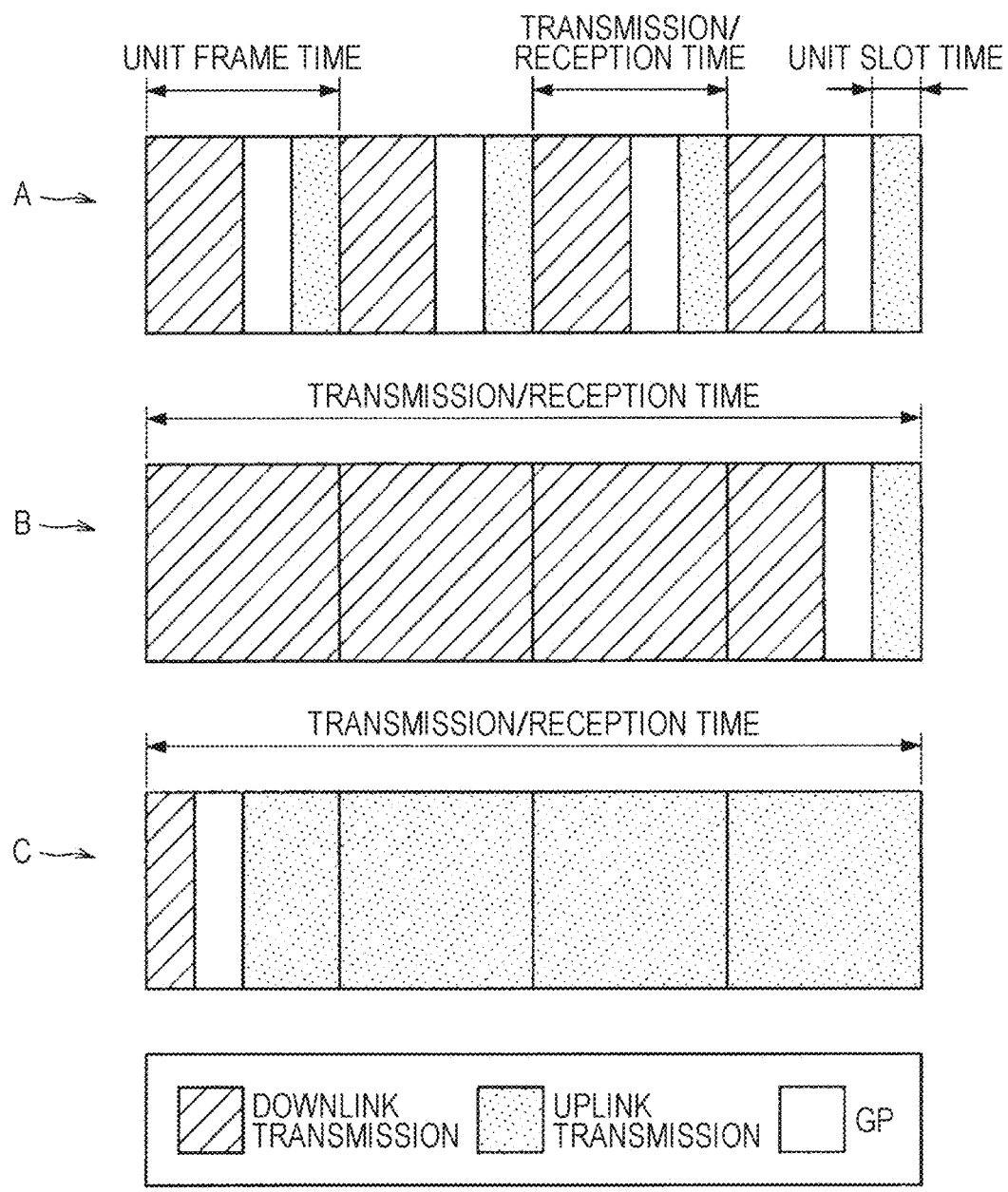
FIG. 1 is an explanatory diagram illustrating examples (A to C) of self-contained transmission frame configurations according to the embodiment.

Hereinafter, (a) preferred embodiment(s) of the present disclosure will be described in detail with reference to the appended drawings. Note that, in this specification and the appended drawings, constituent elements that have substantially the same function and configuration are denoted with the same reference numerals, and repeated explanation of these constituent elements is omitted.

Note that description will be provided in the following order.
1. Embodiment of present disclosure
1.1. Related technology
1.2. Circumstances
1.3. Configuration examples
1.4. Operation examples
1.5. Others
2. Application examples
3. Conclusion

1. EMBODIMENT OF PRESENT DISCLOSURE

[1.1. Related Technology]

First, technology related to the proposed technique will be described.

<NR Frame Configuration in the Present Embodiment>

In NR, physical channels and/or physical signals can be transmitted by self-contained transmission. FIG. 1 is a diagram showing an example of a frame configuration of self-contained transmission in the present embodiment (A to C). In self-contained transmission, a single transmission/reception includes continuous downlink transmission, GP, and continuous downlink transmission in order from the top. The continuous downlink transmission includes at least a single piece of downlink control information and DMRS. The downlink control information provides an instruction to receive a downlink physical channel included in the continuous downlink transmission or an instruction to transmit an uplink physical channel included in the continuous uplink transmission. In a case where the instruction to receive the downlink physical channel has been provided by the downlink control information, a terminal device 200 attempts to receive the downlink physical channel on the basis of the downlink control information. Then, the terminal device 200 transmits a result as to whether or not the downlink physical channel has been successfully received (successfully decoded), through an uplink control channel included in the uplink transmission allocated after the GP. Meanwhile, in a case where the instruction to transmit the uplink physical channel has been provided by the downlink control information, the uplink physical channel to be transmitted on the basis of the downlink control information is included in uplink transmission, and then transmitted. As described above, it is possible to immediately cope with an increase or decrease in uplink and downlink traffic rates by flexibly switching between uplink data transmission and downlink data transmission according to the downlink control information. Furthermore, it is possible to achieve low-delay downlink communication by providing notification of success or failure in downlink reception through uplink transmission immediately following the downlink reception.

A unit slot time is the smallest time unit defining downlink transmission, GP, or uplink transmission. The unit slot time is reserved for any of downlink transmission, GP, and uplink transmission. The unit slot time does not include both downlink transmission and uplink transmission. The unit slot time may be the minimum transmission time for a channel associated with DMRS included in the unit slot time. One unit slot time is defined by, for example, an NR sampling interval (Ts) or an integral multiple of a symbol length.

A unit frame time may be the minimum time specified in scheduling. The unit frame time may be the smallest unit in which a transport block is transmitted. The unit slot time may be the maximum transmission time for the channel associated with the DMRS included in the unit slot time. The unit frame time may be a unit time for uplink transmission power to be determined in the terminal device 200. The unit frame time may be referred to as a subframe. There are three types of unit frame time as follows: downlink transmission only, uplink transmission only, and a combination of uplink transmission and downlink transmission. One unit frame time is defined by, for example, the NR sampling interval (Ts), the symbol length, or an integral multiple of the unit slot time.

A transmission/reception time is a time required for a single transmission/reception. An interval between a single transmission/reception and another transmission/reception is occupied by a time (gap) in which none of physical channels and physical signals is transmitted. The terminal device 200 does not need to average CSI measurements concerning different transmissions/receptions. The transmission/reception time may be referred to as TTI. One transmission/reception time is defined by, for example, the NR sampling interval (Ts), the symbol length, the unit slot time, or an integral multiple of the unit frame time.

Figure 2:
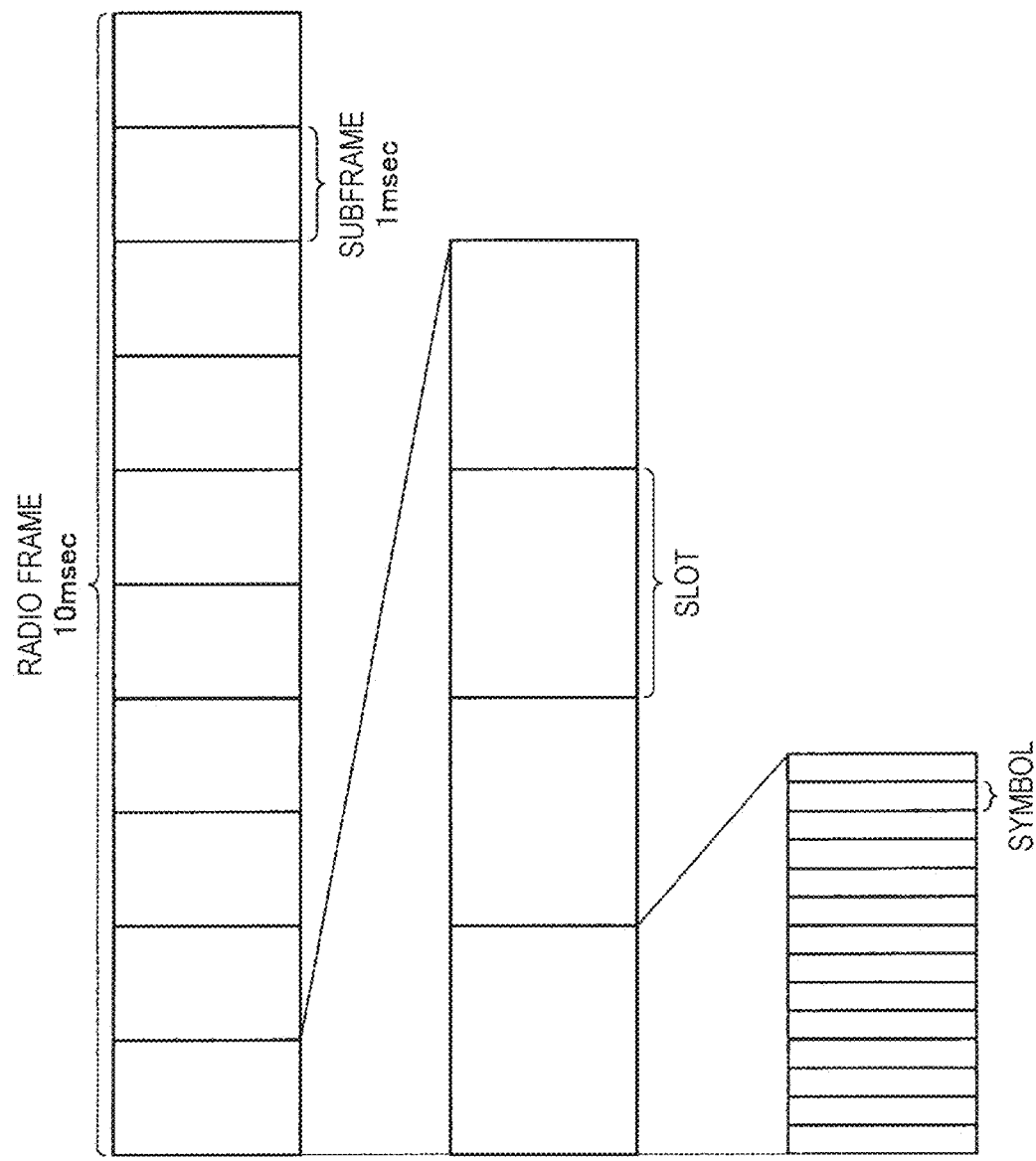
FIG. 2 is an explanatory diagram illustrating a frame configuration.

In the embodiment, a 10 millisecond (ms) radio frame is prescribed. Each radio frame contains two half frames. The time interval of each half frame is 5 ms. Each half frame contains five subframes. The time interval of each subframe is 1 ms. Furthermore, a single subframe contains one or more slots. The time interval of a slot depends on the numerology (OFDM numerology). The numerology is prescribed by the combination of the subcarrier spacing (SCS) and the cyclic prefix (CP). In the embodiment, the supported subcarrier spacings are prescribed by multiplying a standard of 15 kilohertz (kHz) by powers of 2. Specifically, 15 kHz, 30 kHz, 60 kHz, 120 kHz, and 240 kHz are supported as subcarrier spacings. The time interval of a slot is 1 ms for the 15 kHz subcarrier spacing, 0.5 ms for the 30 kHz subcarrier spacing, 0.25 ms for the 60 kHz subcarrier spacing, 0.125 ms for the 120 kHz subcarrier spacing, and 0.0625 ms for the 240 kHz subcarrier spacing. A single slot contains 14 symbols in the case of a normal CP, and 12 symbols in the case of an extended CP. FIG. 2 is an explanatory diagram illustrating a frame configuration. FIG. 3 is a table for explaining a subcarrier spacing setting.

<Resource Allocation for Uplink Channel/Signal According to Embodiment>

In a licensed band, a terminal device is allocated transmission resources for an uplink channel/signal in units of resource blocks according to a designation from a base station device. Generally, it is preferable to allocate resource blocks that are continuous on the frequency axis to the terminal device. This arrangement makes it possible to narrow the transmission bandwidth of the terminal device and improve the transmission power efficiency of the terminal device.

On the other hand, when using an unlicensed band, there is demand for maintaining a constant power spectral density (PSD) in the channel. To reduce the transmission power while keeping the power spectral density (PSD) in the channel constant, interlaced resource allocation is performed with respect to an uplink channel/signal in the embodiment.

Figure 4A:
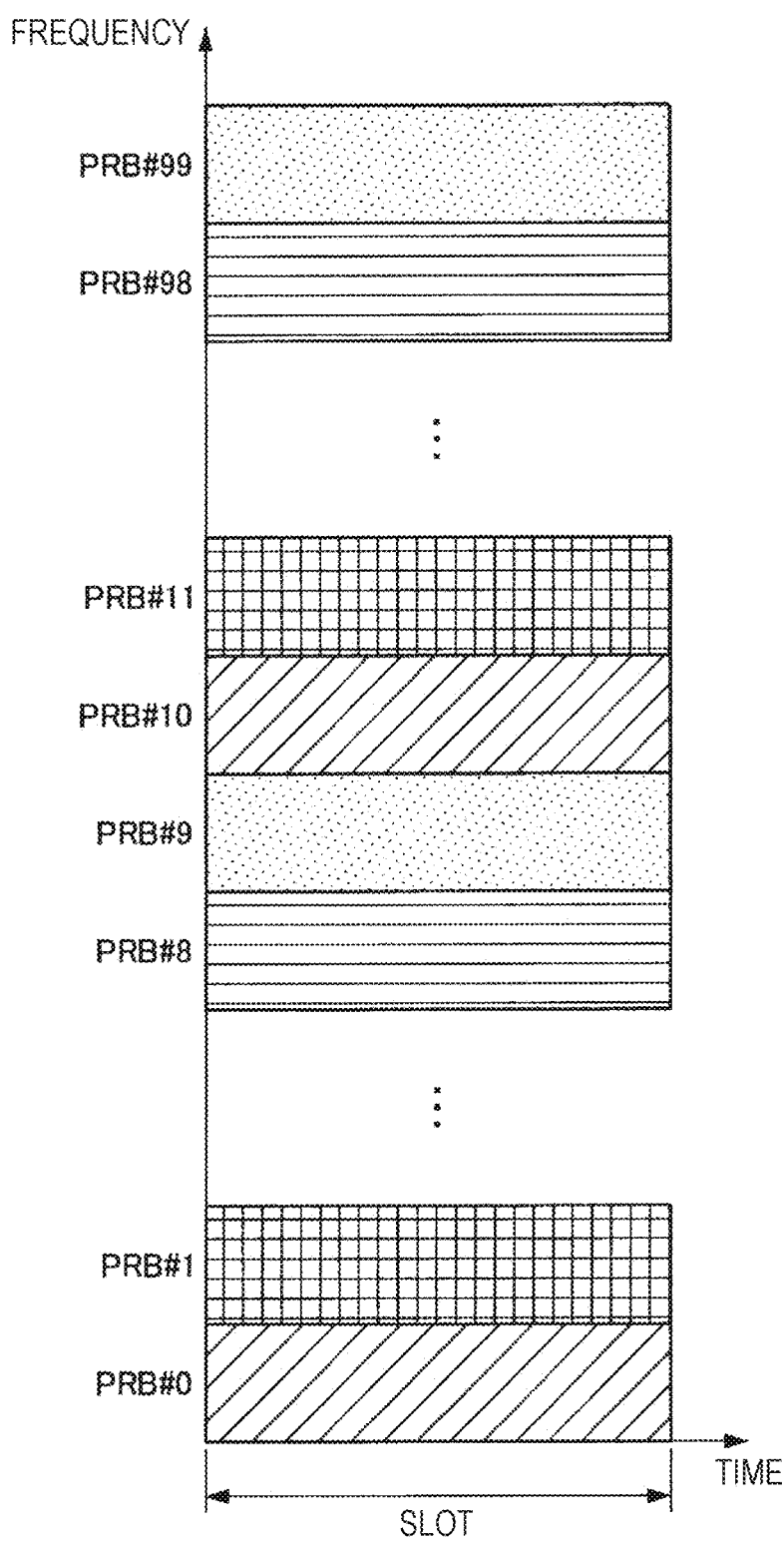
FIG. 4A is a diagram illustrating an example of frequency resource allocation for an uplink channel/signal according to the embodiment.

Interlaced resource allocation refers to allocating resource blocks separated by equal intervals to a predetermined uplink channel/signal. FIG. 4A is an example of frequency resource allocation for an uplink channel/signal according to the embodiment. Resources are allocated to a predetermined terminal device in units of single resource blocks at intervals of 10 resource blocks. With this arrangement, an uplink channel/signal can be transmitted over a wide band with low power consumption.

The number of resource block intervals to use is preferably ⅕ or less than the channel bandwidth. For example, in the case where the channel bandwidth is 20 MHz and the subcarrier spacing is 15 kHz, resources are assigned at intervals of 10 resource blocks (1.8 MHz).

Figure 4B:
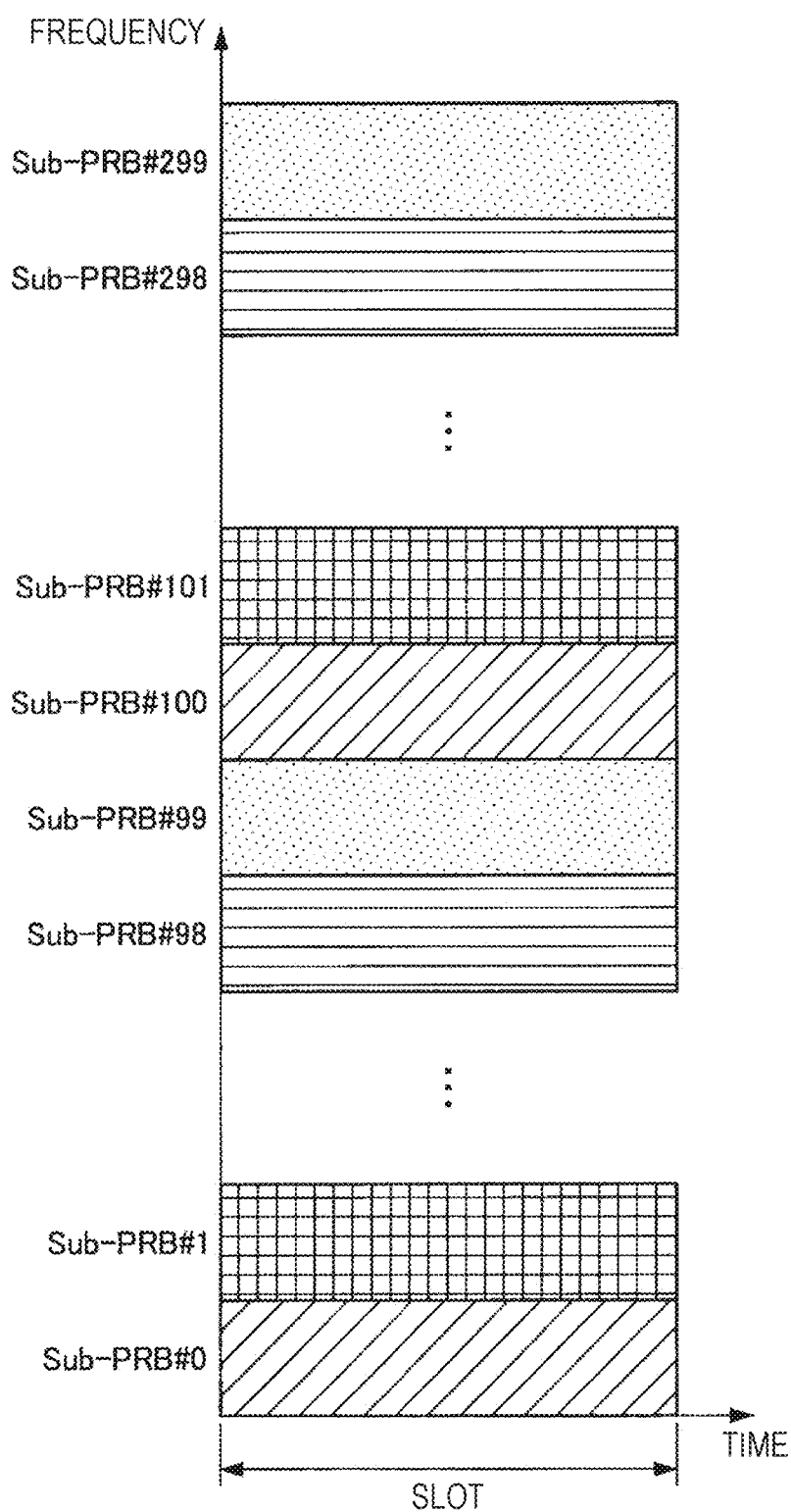
FIG. 4B is a diagram illustrating an example of frequency resource allocation for an uplink/signal according to the embodiment.

Also, the units of interlaced resource allocation are not limited to units of resource blocks. FIG. 4B is an example of frequency resource allocation for an uplink/signal according to the embodiment. The units of interlaced resource allocation in FIG. 4B are sub-resource blocks (sub-PRBs). Sub-resource blocks are units of continuous frequency resources narrower than resource blocks. For example, a sub-resource block is a set of 1, 2, 3, 4, or 6 continuous subcarriers. This arrangement makes more fine-grained resource allocation possible.

Figure 4C:
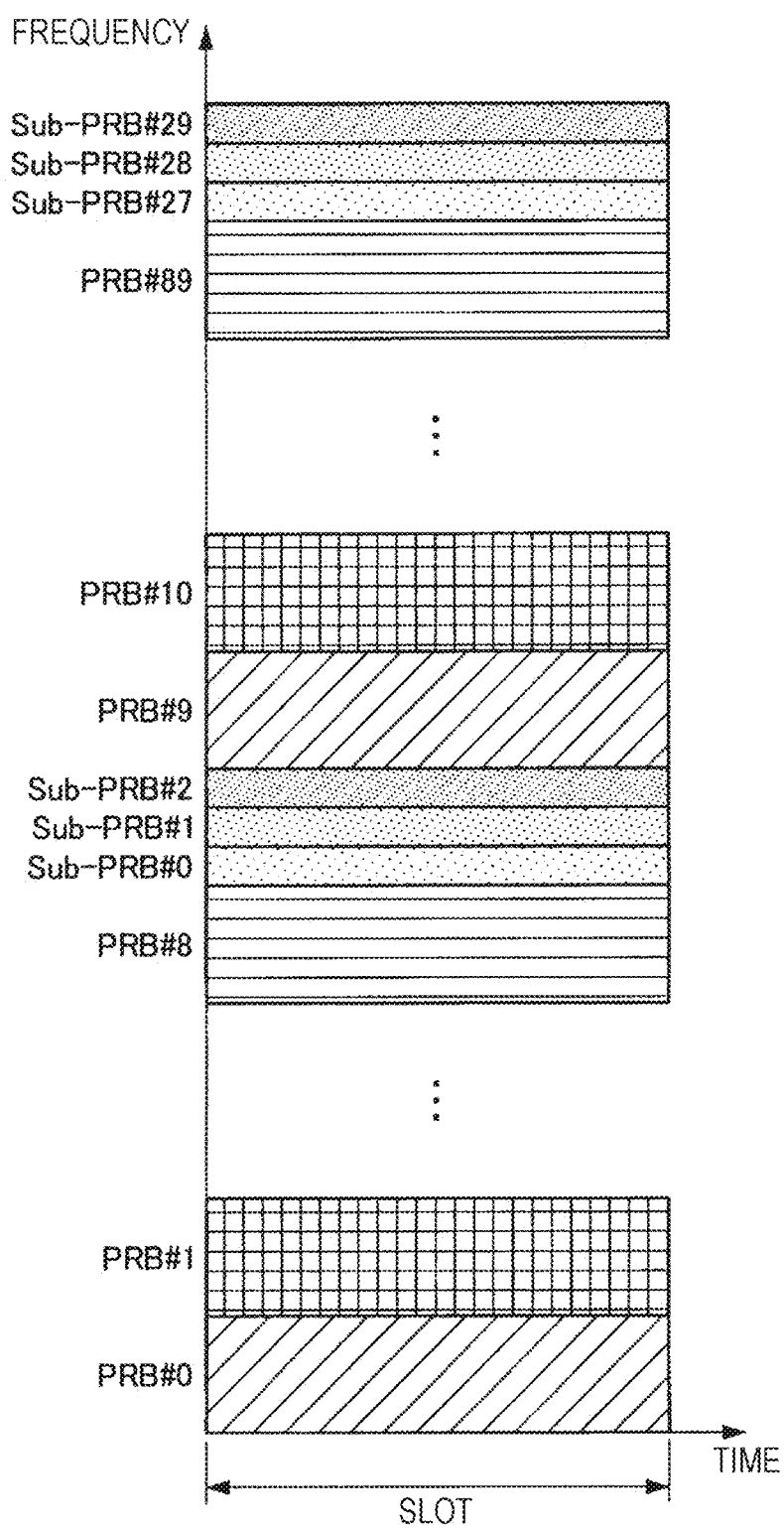
FIG. 4C is a diagram illustrating an example of frequency resource allocation for an uplink channel/signal according to the embodiment.

Furthermore, it is also possible to combine a plurality of different types of interlaced resource allocation. FIG. 4C is an example of frequency resource allocation for an uplink channel/signal according to the embodiment. FIG. 4C is an example in which interlaced resource allocation in units of resource blocks and interlaced resource allocation in units of sub-resource blocks are frequency-multiplexed. For example, the PUCCH is allocated in units of sub-resource blocks while the PUSCH is allocated in units of resource blocks. With this configuration, the amount of allocated resources can be varied flexibly according to the amount of uplink information to transmit.

Figure 4D:
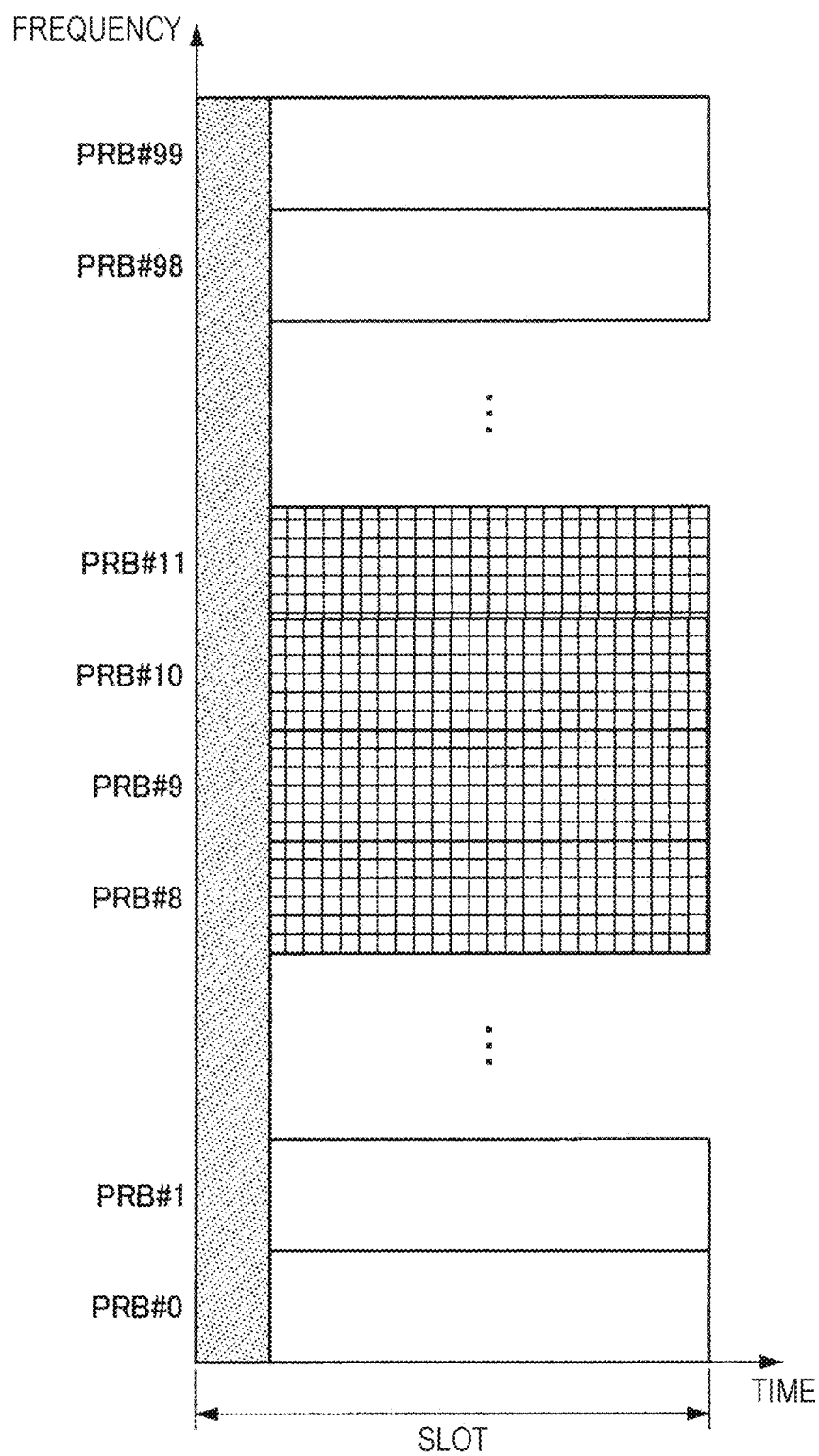
FIG. 4D is a diagram illustrating an example of frequency resource allocation for an uplink channel/signal according to the embodiment.
Figure 4E:
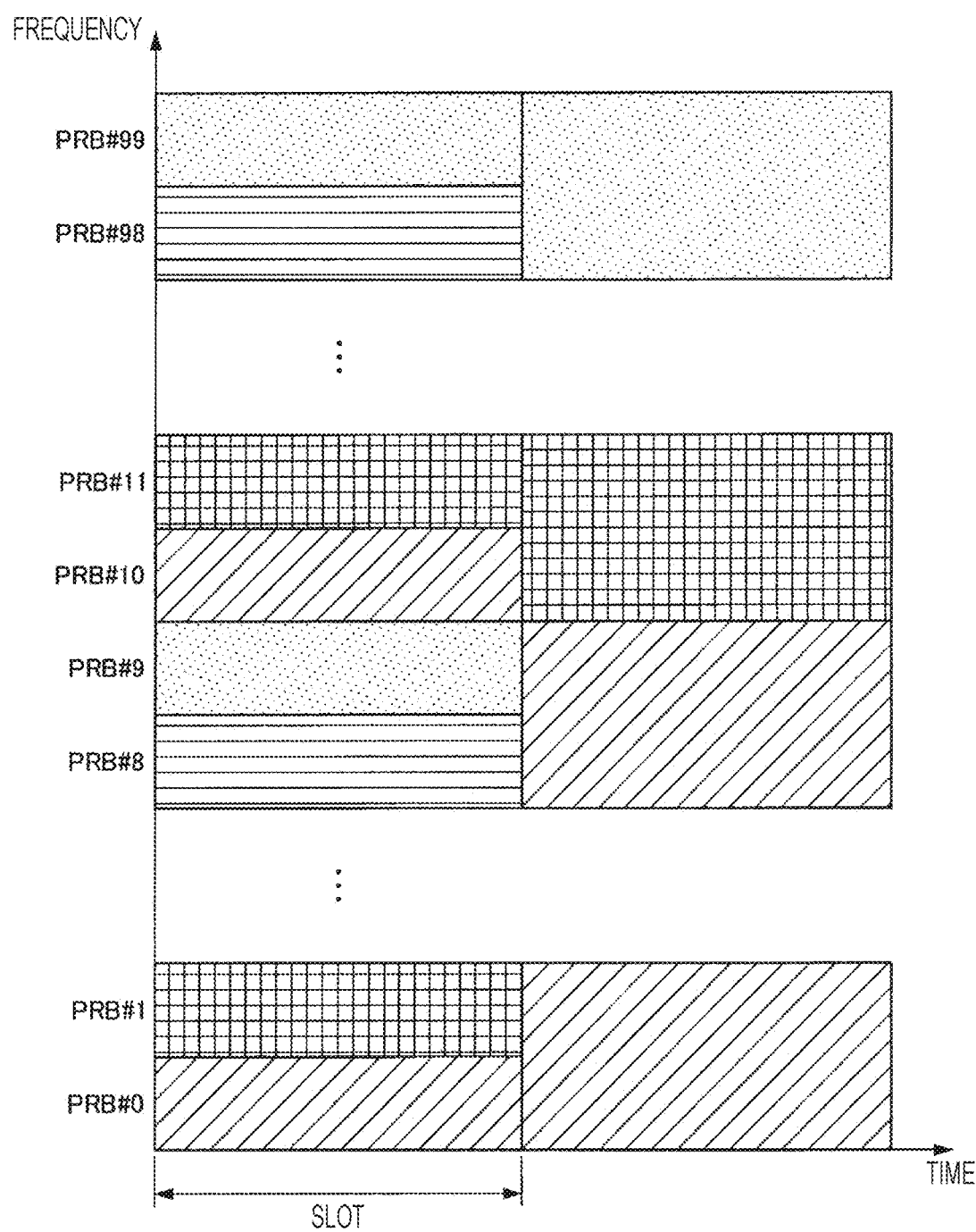
FIG. 4E is a diagram illustrating an example of frequency resource allocation for an uplink channel/signal according to the embodiment.

Furthermore, in the embodiment, wideband transmission and narrowband transmission of an uplink channel/signal can be combined. If the terminal device is still inside the channel exclusivity time after transmitting an uplink channel/signal on a wide band, the terminal device may also transmit an uplink channel/signal subsequently on a narrow band narrower than the channel band. FIGS. 4D and 4E are examples of frequency resource allocation for an uplink channel/signal according to the embodiment. In FIG. 4D, the SRS or the short PUCCH is transmitted using the first few symbols and the full band, and the PUSCH is subsequently transmitted on a narrow band. In FIG. 4E, an uplink channel/signal is transmitted by interlaced resource allocation in a first slot inside the channel exclusivity time, and an uplink channel/signal is transmitted by continuous resource block allocation on the frequency axis in a second slot inside the channel exclusivity time. With this arrangement, both the demand on the power spectral density demand and low power consumption can be achieved.

<UCI>

Uplink control information (UCI) is control information to be transmitted from the terminal device to the base station device. The UCI includes a hybrid automatic repeat request acknowledgement (HARQ-ACK), channel state information (CSI) and/or a scheduling request (SR).

The HARQ-ACK is information indicating an acknowledgement (ACK) or a negative acknowledgement (NACK) of a corresponding PDSCH. The terminal device transmits a bit indicating the ACK in a case where decoding of a transport block of the corresponding PDSCH is successful, otherwise, transmits a bit indicating the NACK. The base station device controls retransmission of the PDSCH on the basis of this information of the HARQ-ACK. The HARQ-ACK is associated for each transport block. Further, the HARQ-ACK can be associated for each code block group (CBG). The code block group is a set of code blocks. Further, the number of code blocks in one code block group is set by an upper layer (RRC signaling).

The CSI is information indicating a channel state between the terminal device and a serving cell. The CSI includes a channel quality indicator (CQI), a precoding matrix indicator (PMI), a CSI-RS resource indicator (CRI), an SSB/PBCH block resource indicator (SSBRI), a layer indicator (LI), a rank indicator (RI), and/or a layer 1 reference signal received power (L1-RSRP).

The CQI is information representing a maximum index which does not exceed a predetermined transport block error probability among combinations of modulation schemes and target code rates at a predetermined transport block size. For example, 10-1, 10-5, or the like, is used as the predetermined transport block error probability. The terminal device calculates the CQI assuming the reported PMI, RI and CRI. The CQI is classified into a wideband CQI and a narrowband CQI (subband CQI).

The PMI is information representing an index of a precoding codebook which is appropriate for the terminal device in an assumed environment. The terminal device calculates the PMI assuming the reported RI and CRI.

The CRI is information indicating a CSI-RS resource which is appropriate for the terminal device among a CSI-RS resource set.

The SSBRI is information indicating an SS/PBCH block resource which is appropriate for the terminal device among an SS/PBCH block resource set.

The LI is information indicating a column of a precoding matrix of the reported PMI corresponding to a layer of the strongest code word corresponding to the reported wideband CQI. The terminal device calculates the LI assuming the reported COI, PMI, RI and CRI.

The RI is information representing a rank which is appropriate for the terminal device in an assumed environment.

The L1-RSRP is information regarding a received signal measured using the set CSI-RS or SS/PBCH block.

The SR is information to be used for requesting scheduling of an uplink to the serving cell.

The UCI is transmitted using a PUCCH or a PUSCH.
<PUCCH>

Figure 5A:
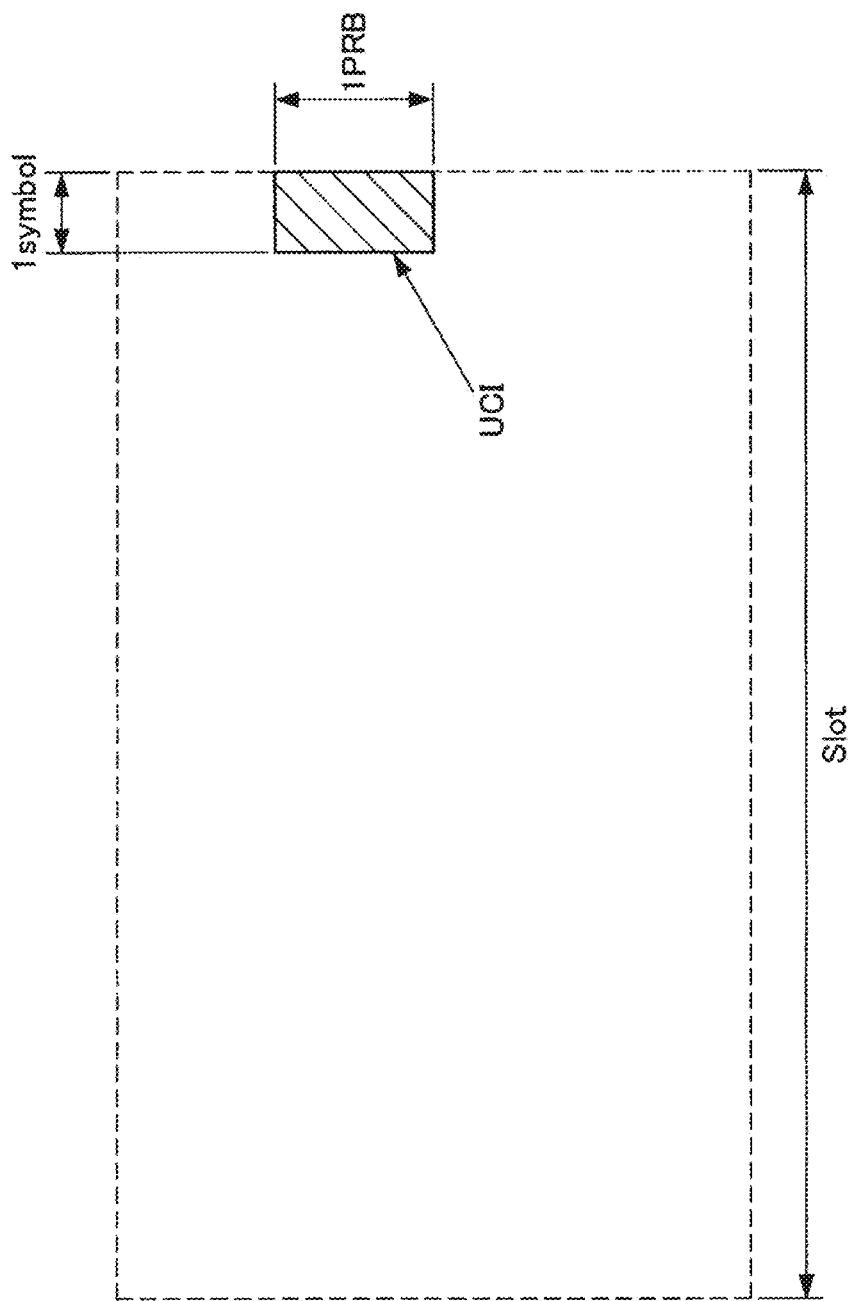
FIG. 5A is an explanatory diagram illustrating a configuration example of a PUCCH format 0.
Figure 5B:
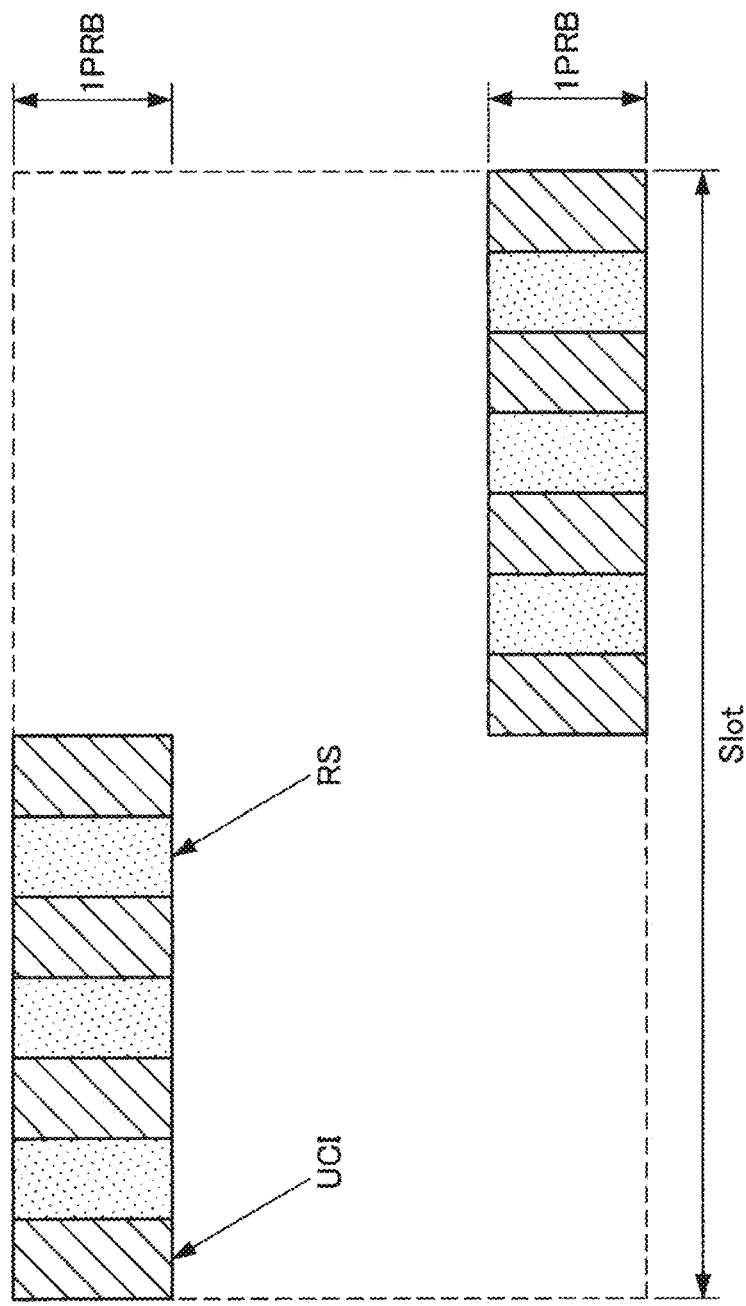
FIG. 5B is an explanatory diagram illustrating a configuration example of a PUCCH format 1.
Figure 7:
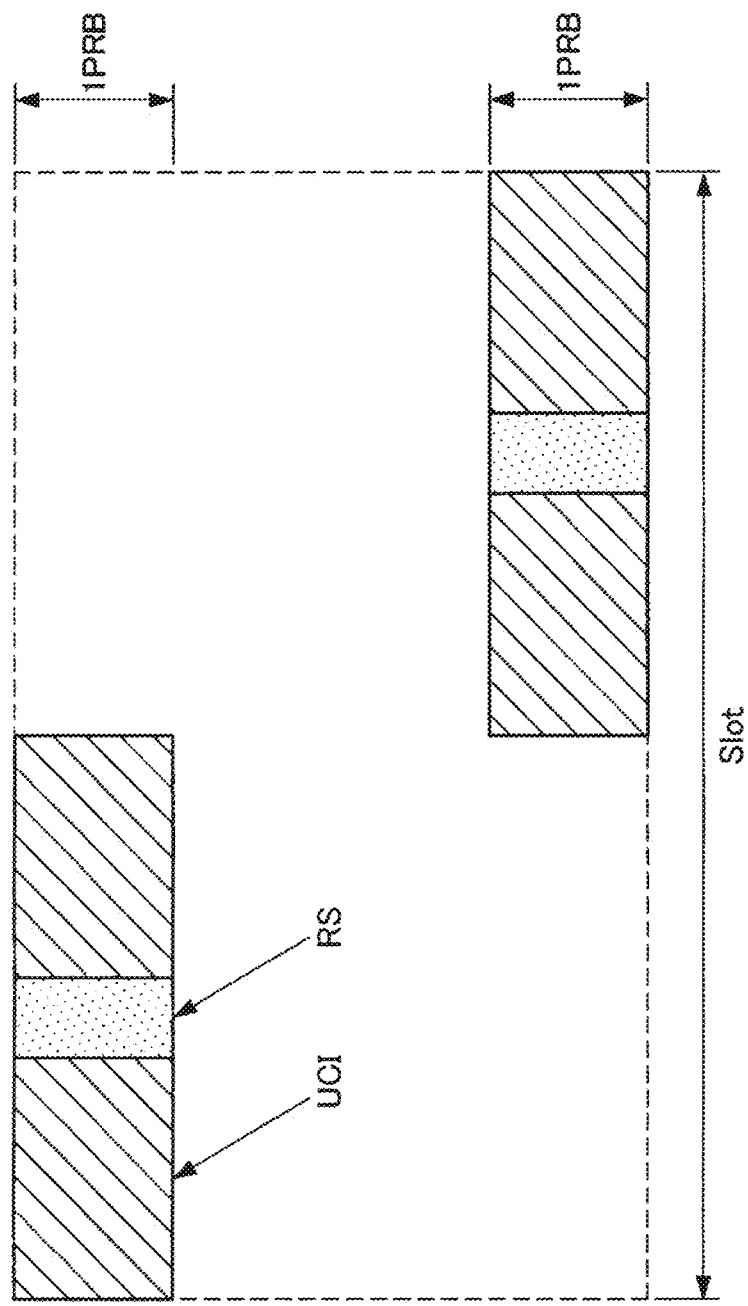
FIG. 7 is an explanatory diagram illustrating a configuration example of PUCCH formats 3 and 4.

The PUCCH is used for transmitting an UCI. Five types of PUCCH formats are defined in accordance with a symbol length and the number of transmission bits. FIG. 5A is an explanatory diagram illustrating a configuration example of a PUCCH format 0. FIG. 5B is an explanatory diagram illustrating a configuration example of a PUCCH format 1. FIG. 6 is an explanatory diagram illustrating a configuration example of a PUCCH format 2. FIG. 7 is an explanatory diagram illustrating a configuration example of a PUCCH format 3 and a PUCCH format 4.

The PUCCH format 0 includes one or two symbols and is used for transmitting a UCI of two or less bits. The PUCCH format 0 is transmitted using one RB. The PUCCH format 1 includes 4 to 14 symbols and is used for transmitting a UCI of two or less bits. The PUCCH format 1 is transmitted using one RB. The PUCCH format 2 includes one or two symbols and is used for transmitting a UCI of three or more bits. The PUCCH format 2 is transmitted using 1 to 16 RBs. The PUCCH format 3 includes 4 to 14 symbols and is used for transmitting a UCI of three or more bits. The PUCCH format 3 is transmitted using 1 to 16 RBs. The PUCCH format 4 includes 4 to 14 symbols and is used for transmitting a UCI of three or more bits. The PUCCH format 4 is transmitted using one RB. The PUCCH format 0 and the PUCCH format 2 are also referred to as a short PUCCH. The PUCCH format 1, the PUCCH format 3 and the PUCCH format 4 are also referred to as a long PUCCH.

Up to four PUCCH resources are set at the terminal device from the upper layer. Each PUCCH resource is associated with a PUCCH resource index. A PUCCH format and a start PRB index are set for each PUCCH resource. A cyclic shift index, a start symbol index and a symbol length are set for the PUCCH resource of the PUCCH format 0. Further, a cyclic shift index, a start symbol index, a symbol length and an orthogonal cover code (OCC) index on a time axis are set for the PUCCH resource of the PUCCH format 1. Still further, the number of RBs, a start symbol index, and a symbol length are set for the PUCCH resources of the PUCCH format 2 and the PUCCH format 3. Yet further, an OCC index, an OCC length, a start symbol index and a symbol length are set for the PUCCH resource of the PUCCH format 4.

Transmission of the PUCCH can be classified into an aperiodic PUCCH and a periodic PUCCH.

The aperiodic PUCCH is mainly used for transmitting an HARQ-ACK and a CSI. An instruction to transmit the aperiodic PUCCH is given by a DCI (DL DCI, DL Scheduling assignment, DL grant) which schedules the PDSCH. A transmission slot of the aperiodic PUCCH is indicated in a field included in the DL DCI. A notification of an offset value of a PDSCH slot scheduled by the DL DCI and a PUCCH slot including the HARQ-ACK corresponding to the PDSCH is made by the DL DCI. Further, the PUCCH resource index is indicated by the DL DCI. The terminal device transmits the PUCCH using the PUCCH resource indicated by the DL DCI.

The periodic PUCCH is mainly used for transmitting a CSI and an SR. An instruction to transmit the periodic PUCCH is given by the upper layer. A notification of a period of the periodic PUCCH and an offset is made by RRC signaling.

<Channel Access Procedure of Unlicensed Channel>

The channel access (Listen Before Talk) procedure is performed by the base station device or the terminal device to access an unlicensed channel for transmission.

Channel sensing is performed once or multiple times in the channel access procedure. Determination (vacancy determination) as to whether a channel is idle (unoccupied, available, or enable) or busy (occupied, unavailable, or disable) is made on the basis of a result of the sensing. The power of the channel in a predetermined latency is sensed in the channel sensing.

Examples of the latency in the channel access procedure include a first latency (slot), a second latency, and a third latency (defer period), a fourth latency.

A slot is the unit of latency of a base station device and a terminal device in the channel access procedure. The slot is defined as, for example, 9 microseconds.

A single slot is inserted at the beginning of the second latency. The second latency is defined as, for example, 16 microseconds.

A defer period includes the second latency and a plurality of consecutive slots following the second latency. The number of the plurality of consecutive slots following the second latency is determined on the basis of a priority class (channel access priority class) to be used to satisfy QoS.

The fourth latency includes the second latency and a single slot following the second latency.

The base station device or the terminal device senses a predetermined channel during a period of a predetermined slot. The predetermined slot is considered idle in a case where the base station device or the terminal device detects power smaller than a predetermined power detection threshold for at least 4 microseconds in the period of the predetermined slot. Meanwhile, in a case where the detected power is larger than the predetermined power detection threshold, the predetermined slot is considered busy.

The channel access procedures include a first channel access procedure and a second channel access procedure. The first channel access procedure is performed by use of a plurality of slots and the defer period. Furthermore, the second channel access procedure is performed by use of the single fourth latency.

Parameters related to channel access are determined on the basis of the priority class. Examples of the parameters related to channel access include a minimum contention window, a maximum contention window, a maximum channel exclusivity time, and values that the contention window may take. The priority class is determined by a QoS class identifier (QCI) that processes quality of service (QoS). A correspondence table between the priority class and parameters related to channel access is illustrated in Table 1, and an example of a mapping between the priority class and the QCI is illustrated in Table 2.

TABLE 1

Example of correspondence relationships between priority class and parameters related to channel access

| Channel access priority class (p) | $m_p$ | Minimum contention window $CW_{min,p}$ | Maximum contention window $CW_{max,p}$ | Maximum channel exclusivity time $T_{mcot,p}$ | Values that contention window $CW_p$ may take |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

Example of mapping between priority class and QCI

| Channel access priority class (p) | QCI |
|---|---|
| 1 | 1, 3, 5, 65, 66, 69, 70 |
| 2 | 2, 7 |
| 3 | 4, 6, 8, 9 |
| 4 | Other than above |

<Details of First Channel Access Procedure>

Procedures set forth below are performed in the first channel access procedure.

(0) Channel sensing is performed in the defer period. In a case where the channel is idle in a slot within the defer period, the process proceeds to step (1). Otherwise, the process proceeds to step (6).

(1) A counter initial value is acquired. Possible values of the counter initial value are integers between 0 and a contention window CW. Furthermore, the counter initial value is randomly determined in accordance with a uniform distribution. Then, the initial value of a counter N is set to the acquired counter initial value, and the process proceeds to step (2).

(2) In a case where a value of the counter N is larger than 0 and decrement of the counter N has been selected, the counter N is decremented by 1. Thereafter, the process proceeds to step (3).

(3) The process shifts to a standby state after a slot period is added. Furthermore, the channel is sensed in the additional slot. In a case where the additional slot is idle, the process proceeds to step (4). Otherwise, the process proceeds to step (5).

(4) In a case where the counter N indicates 0, this procedure is stopped. Otherwise, the process proceeds to step (2).

(5) The process shifts to a standby state after a defer period is added. Furthermore, the channel is sensed until it is detected that any one of slots included in the added defer period is busy, or until it is detected that all the slots included in the added defer period are idle. Thereafter, the process proceeds to step (6).

(6) In a case where it is sensed that the channel is idle in all the slots included in the added defer period, the process proceeds to step (4). Otherwise, the process proceeds to step (5).

After step (4) is stopped in the above procedure, transmission including data is performed on the channel by use of PDSCH, PUSCH, or the like.

Note that transmission need not be performed on the channel after step (4) is stopped in the above procedure. In this case, it is possible to then perform transmission without performing the above procedure, in a case where the channel is idle in all of the slots and the defer periods immediately before transmission. Meanwhile, in a case where the channel is not idle in any of the slots and the defer periods, the process proceeds to step (1) of the above procedure after it is sensed that the channel is idle in all the slots in the added defer period.

<Details of Second Channel Access Procedure>

In the second channel access procedure, transmission may be performed immediately after the channel is considered idle as a result of sensing in at least the fourth latency. Meanwhile, in a case where the channel is not considered idle as a result of the sensing in at least the fourth latency, no transmission is performed.

<Contention Window Adaptive Procedure>

A contention window CW to be used in the first channel access procedure is determined on the basis of the contention window adaptive procedure.

The value of the contention window CW is held for each priority class. Furthermore, the contention window CW takes a value between a minimum contention window and a maximum contention window. The minimum contention window and the maximum contention window are determined on the basis of the priority class.

Adjustment of the value of the contention window CW is performed prior to step (1) in the first channel access procedure. The value of the contention window CW is increased in a case where the rate of NACKs is higher than a threshold in at least a HARQ response corresponding to a reference subframe in the contention window adaptive procedure or a shared channel in a reference HARQ process. Otherwise, the value of the contention window CW is set to the minimum contention window.

The value of the contention window CW is increased on the basis of, for example, the following equation: $CW=2\cdot(CW+1)-1$.

<Details of Channel Access Procedure in Downlink>

In a case of performing downlink transmission including PDSCH, PDCCH, and/or EPDCCH in an unlicensed channel, a base station device accesses the channel to perform the downlink transmission on the basis of the first channel access procedure.

Meanwhile, in a case of performing downlink transmission not including PDSCH but including DRS in an unlicensed channel, the base station device accesses the channel to perform the downlink transmission on the basis of the second channel access procedure. Note that it is preferable that the duration of the downlink transmission be smaller than 1 millisecond.

<Details of Channel Access Procedure in Uplink>

In a case where there is an instruction to perform the first channel access procedure in an uplink grant for scheduling PUSCH in an unlicensed channel, a terminal device performs the first channel access procedure prior to uplink transmission including the PUSCH.

Further, in a case where there is an instruction to perform the second channel access procedure in an uplink grant for scheduling PUSCH, a terminal device performs the second channel access procedure prior to uplink transmission including the PUSCH.

In addition, the terminal device performs the second channel access procedure for uplink transmission not including PUSCH but including SRS, prior to the uplink transmission.

Furthermore, in a case where the end of uplink transmission specified in the uplink grant is within uplink duration (UL duration), the terminal device performs the second channel access procedure prior to the uplink transmission, regardless of the type of procedure specified in the uplink grant.

Moreover, in a case where uplink transmission is performed after the fourth latency following the completion of downlink transmission from the base station, the terminal device performs the second channel access procedure prior to the uplink transmission.

<NR Channel Access Procedure According to Embodiment>

In the channel access procedure for an unlicensed channel using NR, channel sensing without beamforming and channel sensing with beamforming are performed.

Channel sensing without beamforming is channel sensing by receiving without controlling the directivity, or channel sensing that lacks direction information. Channel sensing that lacks direction information refers to channel sensing in which the measurement results from all directions are averaged, for example. The transmitting station does not have to be aware of the directivity (angle, direction) used by the channel sensing.

Channel sensing with beamforming is channel sensing by receiving while controlling the directivity, or channel sensing that has direction information. In other words, channel sensing with beamforming is channel sensing in which the reception beam is pointed in a predetermined direction. A transmitting station having the function of performing channel sensing with beamforming can perform channel sensing one or more times using different directivity.

By performing channel sensing with beamforming, the area to be detected by sensing is narrowed. With this arrangement, the transmitting station can decrease the frequency of detecting non-interfering communication links and reduce the exposed node problem.

[1.2. Circumstances]

In an NR unlicensed band (NR-U), a variety of use cases are expected to be supported, including not only Licensed Assisted Access (LAA) using the mechanism of carrier aggregation, but also dual connectivity, standalone operation in unlicensed bands only, and cases where one of either the DL carrier or the UL carrier is in a licensed band while the other is in an unlicensed band (for example, licensed DL and unlicensed UL).

To support these use cases, in an NR-U, the ability to transmit physical channels and physical signals transmitted by a primary cell (PCell), a secondary primary cell (PSCell), or a special cell (SpCell), such as the synchronization signal (SS), the PRACH, and PUCCH, in unlicensed bands is necessary.

Generally, in an unlicensed band, a communication device performs channel sensing and determines whether the channel is clear or busy before transmitting a physical channel and/or a physical signal. In the case where the channel is clear (LBT success), the communication device can transmit a physical channel and/or a physical signal. On the other hand, in the case where the channel is busy (LBT failure), the communication device cannot transmit a physical channel and/or a physical signal.

There can be a case where the communication device cannot transmit a PUCCH as a result of LBT failure. For example, in a case where another adjacent access point utilizes a channel due to a hidden terminal problem, the communication device determines that the channel is busy, and cannot perform transmission.

Figure 8:
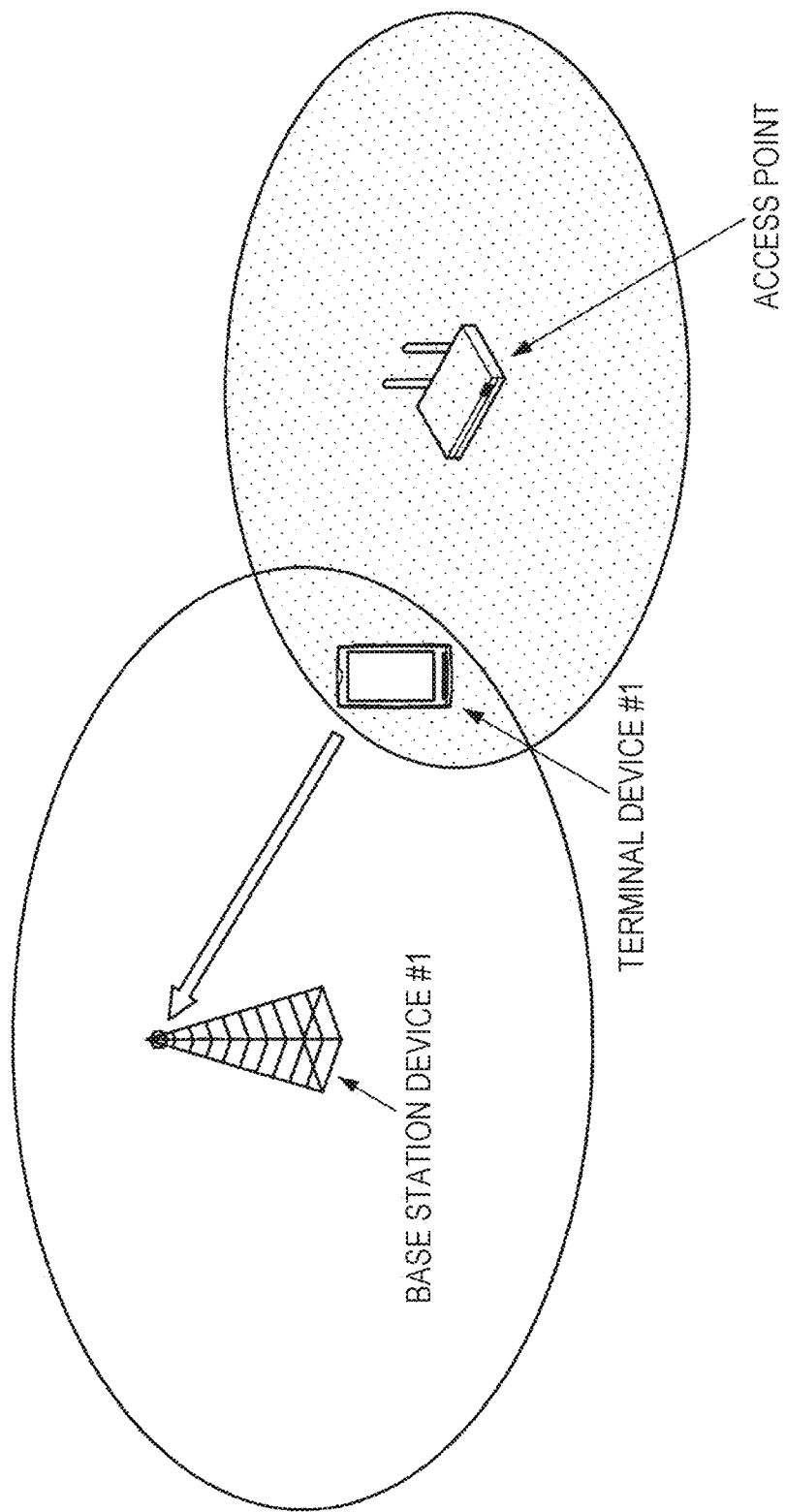
FIG. 8 is an explanatory diagram illustrating a situation in which an access point exists near a terminal device, and the access point is using the channel.
Figure 9:
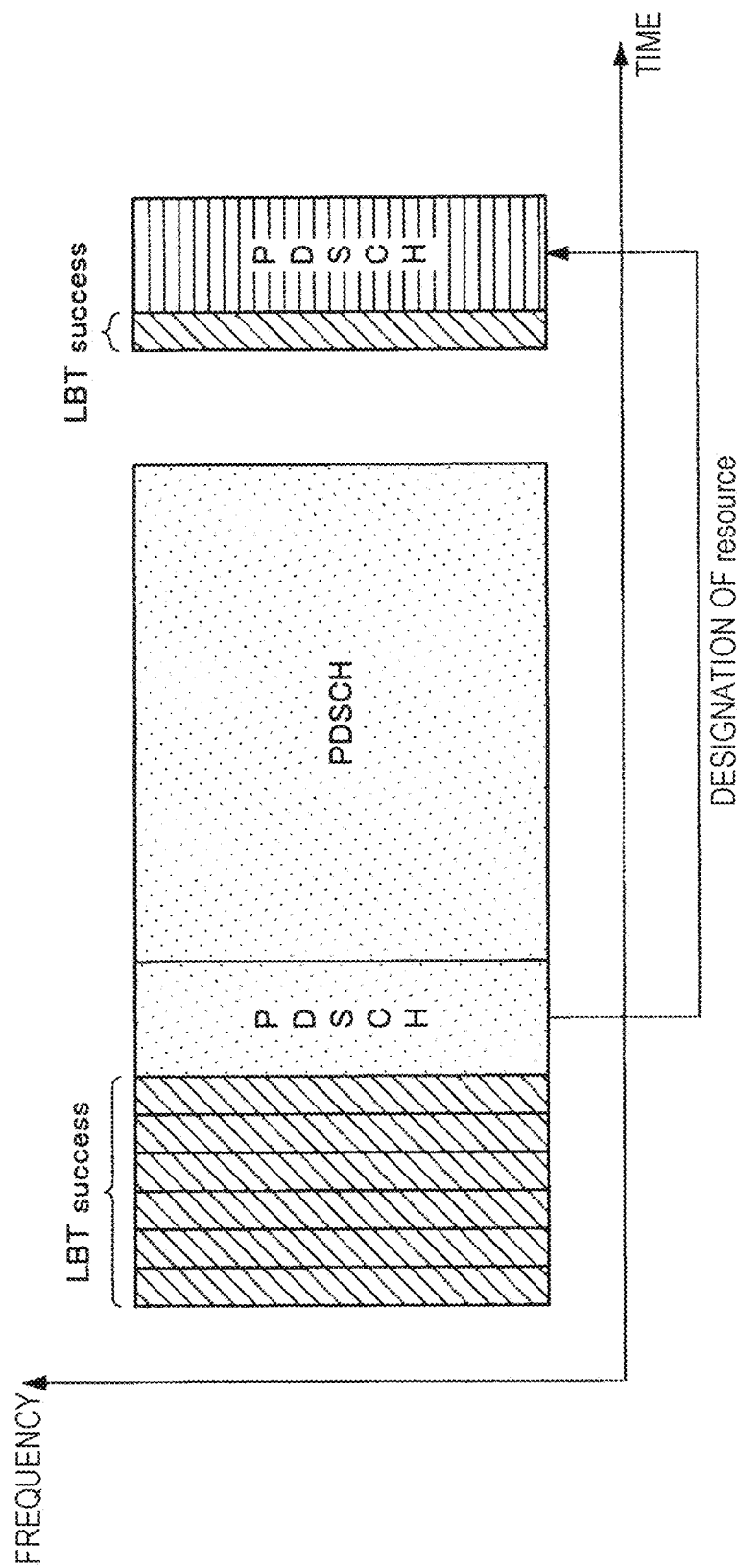
FIG. 9 is an explanatory diagram illustrating an aspect where a communication device can transmit a PUCCH as a result of LBT success.
Figure 10:
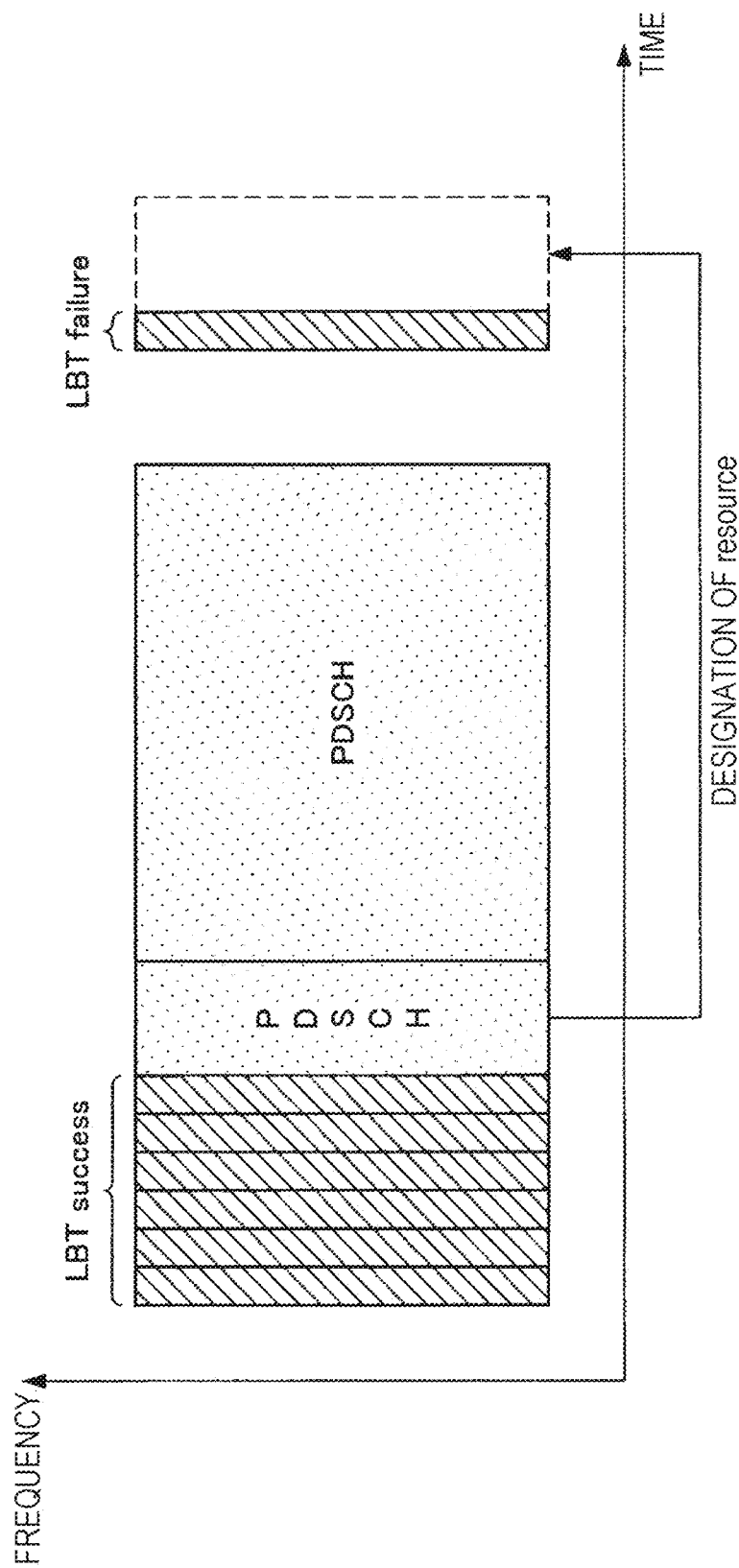
FIG. 10 is an explanatory diagram illustrating an aspect where the communication device cannot transmit a PUCCH as a result of LBT failure.

FIG. 8 is an explanatory diagram illustrating an aspect where an access point is located near the terminal device, and the access point uses a channel. FIG. 9 is an explanatory diagram illustrating an aspect where the communication device can transmit a PUCCH as a result of LBT success. FIG. 10 is an explanatory diagram illustrating an aspect where the communication device cannot transmit a PUCCH as a result of LBT failure.

The PUCCH is used for transmitting a hybrid ARQ (HARQ)-acknowledgement (ACK) corresponding to the PDSCH. In a case where this HARQ-ACK is not returned from the designated resource, the base station device retransmits the PDSCH again even if the terminal device side can normally decode the PDSCH. This results in degradation of resource efficiency.

Accordingly, the author of the present disclosure has studied the points described above and investigated technology enabling resources to be used efficiently in an NR-U. As a result, as described hereinafter, the author of the present disclosure proposes a technology enabling resources to be used efficiently in an NR-U by allowing the PUCCH to be transmitted when LBT failure occurs.

[1.3. Configuration Examples]

Figure 11:
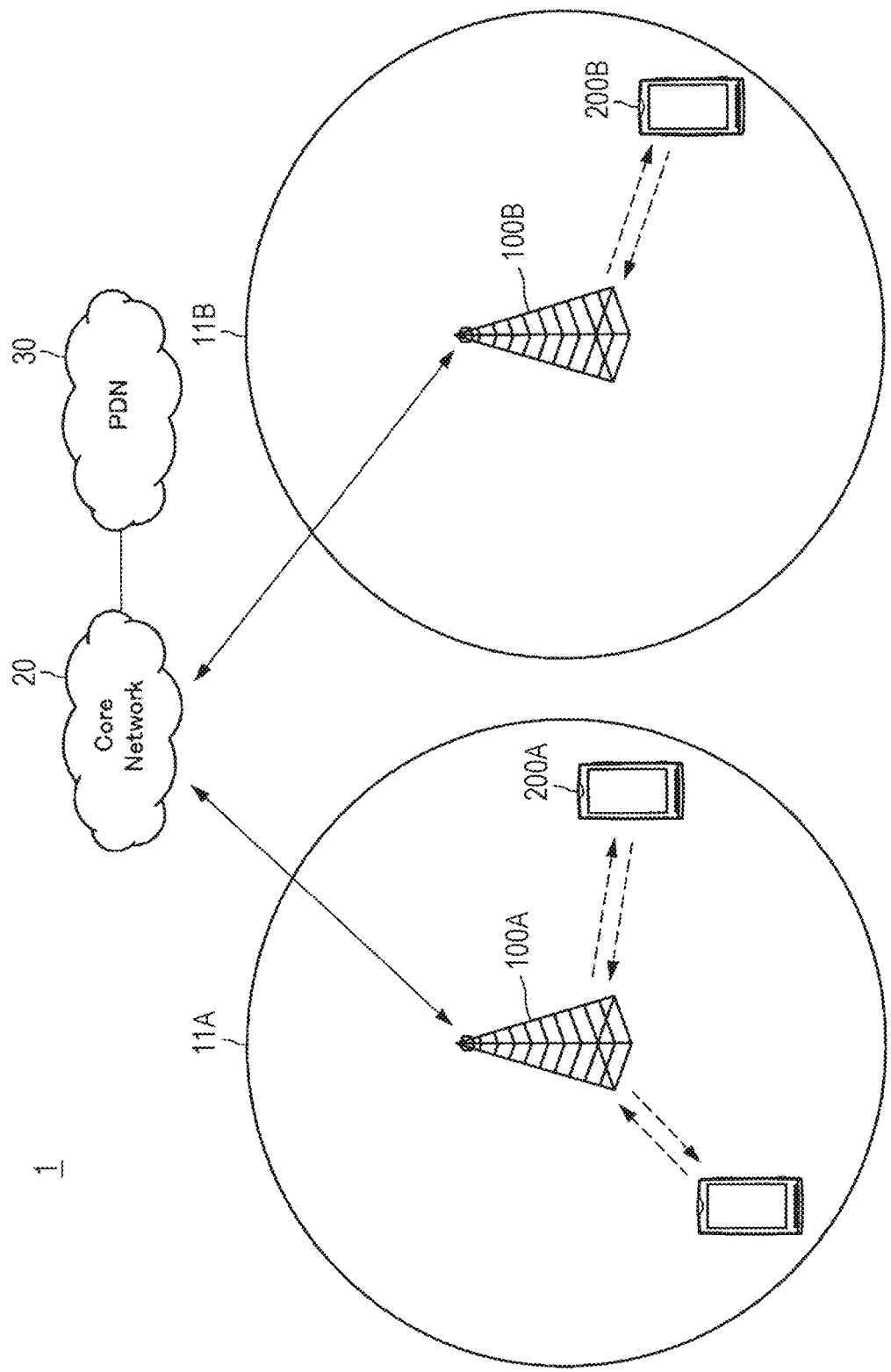
FIG. 11 is a diagram illustrating an example of an overall configuration of a system according to an embodiment of the present disclosure.

FIG. 11 is a diagram illustrating an example of an overall configuration of a system 1 according to an embodiment of the present disclosure. As illustrated in FIG. 11, the system 1 includes base station devices 100 (100A and 100B), terminal devices 200 (200A and 200B), a core network 20, and a packet data network (PDN) 30.

The base stations devices 100 operate cells 11 (11A or 11B), and provide wireless service to one or more terminal devices positioned inside the cells 11. For example, the base station device 100A provides wireless service to the terminal device 200A, and the base station device 100B provides wireless service to the terminal device 200B. The cells 11 may be operated in accordance with any wireless communication method, such as LTE or New Radio (NR) for example. The base station devices 100 are connected to the core network 20. The core network 20 is connected to the PDN 30.

The core network 20 may include a Mobility Management Entity (MME), a Serving Gateway (S-GW), a PDN Gateway (P-GW), a Policy and Charging Rules Function (PCRF), and a Home Subscriber Server (HSS). Alternatively, the core network 20 may include an NR entity having functions similar to the above. The MME is a control node that handles signals in the control plane, and manages the mobility state of terminal devices. The S-GW is a control node that handles signals in the user plane, and is a gateway device that switches the forwarding path for user data. The P-GW is a control node that handles signals in the user plane, and is a gateway device that acts a connecting point between the core network 20 and the PDN 30. The PCRF is a control node that controls behavior related to policies such as quality of service (QoS) for bearers, and also charging. The HSS is a control node that handles subscriber data and service control.

The terminal devices 200 wirelessly communicate with the base station devices 100 on the basis of control by the base station devices 100. The terminal devices 200 may be what is referred as user equipment (UE), but may also be relay nodes that relay transmissions to other terminal devices. For example, the terminal devices 200 transmit uplink signals to the base station devices 100 and receive downlink signals from the base station devices 100.

In the present embodiment in particular, the base station devices 100A and 100B are managed by respectively different operators. For example, the base station device 100A is managed by an operator A while the base station device 100B is managed by an operator B. Additionally, the base station devices 100A and 100B share the use of radio resources that are shareable between the respectively managing operators to provide wireless communication services.

Next, configuration examples of the base station devices 100 and the terminal devices 200 according to an embodiment of the present disclosure will be described.

Figure 12:
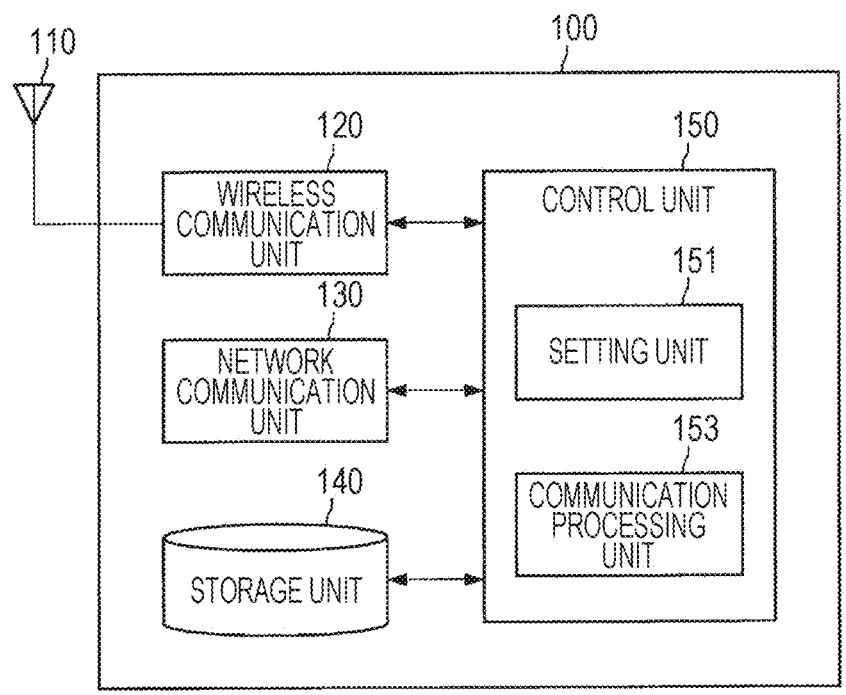
FIG. 12 is a block diagram illustrating an example of the configuration of a base station device according to the embodiment.

FIG. 12 is a block diagram illustrating an example of the configuration of a base station device 100 according to the embodiment. Referring to FIG. 12, the base station device 100 includes an antenna unit 110, a wireless communication unit 120, a network communication unit 130, a storage unit 140, and a control unit 150.

(1) Antenna Unit 110

The antenna unit 110 emits a signal output from the wireless communication unit 120, as radio waves in the air. Furthermore, the antenna unit 110 converts radio waves in the air into a signal, and outputs the signal to the wireless communication unit 120.

(2) Wireless Communication Unit 120

The wireless communication unit 120 transmits and receives signals. For example, the wireless communication unit 120 transmits a downlink signal to a terminal device, and receives an uplink signal from the terminal device.

(3) Network Communication Unit 130

The network communication unit 130 transmits and receives information. For example, the network communication unit 130 transmits information to other nodes, and receives information from other nodes. Examples of the other nodes described above include another base station and a core network node.

(4) Storage Unit 140

The storage unit 140 temporarily or permanently stores a program and various data for operation of the base station device 100.

(5) Control Unit 150

The control unit 150 controls the operation of the base station device 100 as a whole to provide the various functions of the base station device 100. The control unit 150 includes, for example, a processor such as a central processing unit (CPU), various kinds of storage media such as a ROM, and the like. The control unit 150 includes a setting unit 151 and a communication processing unit 153.

The setting unit 151 has a function of setting settings related to communication with the terminal devices 200.

The communication processing unit 153 has a function of performing a process of communicating with the terminal devices 200.

The control unit 150 additionally may include other constituent elements besides the above constituent elements. In other words, the control unit 150 may also perform operations other than the operations of the above constituent elements.

Figure 13:
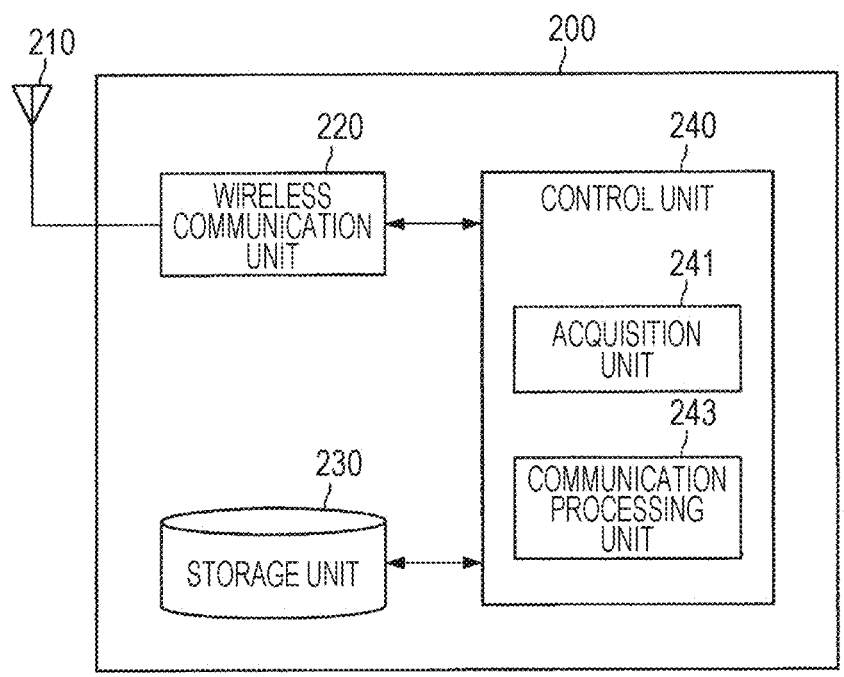
FIG. 13 is a block diagram illustrating an example of the configuration of a terminal device according to the embodiment.

FIG. 13 is a block diagram illustrating an example of the configuration of a terminal device 200 according to the embodiment. Referring to FIG. 13, the terminal device 200 includes an antenna unit 210, a wireless communication unit 220, a storage unit 230, and a control unit 240.

(1) Antenna Unit 210

The antenna unit 210 emits a signal output from the wireless communication unit 220, as radio waves in the air. Furthermore, the antenna unit 210 converts radio waves in the air into a signal, and outputs the signal to the wireless communication unit 220.

(2) Wireless Communication Unit 220

The wireless communication unit 220 transmits and receives signals. For example, the wireless communication unit 220 receives a downlink signal from a base station, and transmits an uplink signal to the base station.

(3) Storage Unit 230

The storage unit 230 temporarily or permanently stores a program and various data for operation of the terminal device 200.

(4) Control Unit 240

The control unit 240 controls the operation of the terminal device 200 as a whole to provide the various functions of the terminal device 200. The control unit 240 includes, for example, a processor such as a central processing unit (CPU), various kinds of storage media such as a ROM, and the like. The control unit 240 includes an information acquisition unit 241 and a communication processing unit 243.

The information acquisition unit 241 has a function of acquiring information from signals obtained from radio waves received by the antenna unit 210.

The communication processing unit 243 has a function of performing a process of communicating with the base station device 100.

The control unit 240 additionally may include other constituent elements besides the above constituent elements. In other words, the control unit 240 may also perform operations other than the operations of the above constituent elements.

Configuration examples of the base station devices 100 and the terminal devices 200 according to an embodiment of the present disclosure have been described above. Next, operations of the base station devices 100 and the terminal devices 200 according to an embodiment of the present disclosure will be described.

[1.4. Operation Examples]

An operation example of the base station device 100 and the terminal device 200 in a case where the terminal device 200 cannot transmit a PUCCH as a result of LBT failure will be described below. Note that in the embodiment, the terminal device 200 may execute LBT in the communication processing unit 243. Consequently, the communication processing unit 243 may function as an example of a determination unit according to the present disclosure.

(1) Adoption of LBT Less (LBT is Not Performed)

A mechanism for preventing LBT failure of the PUCCH will be described here. In a case of this LBT less, that is, in a case where LBT is not performed, only a short PUCCH including up to two symbols is supported. In other words, LBT is performed in a long PUCCH including three or more symbols. Further, in a case of LBT less, a transmission period is preferably shortened.

Figure 14:
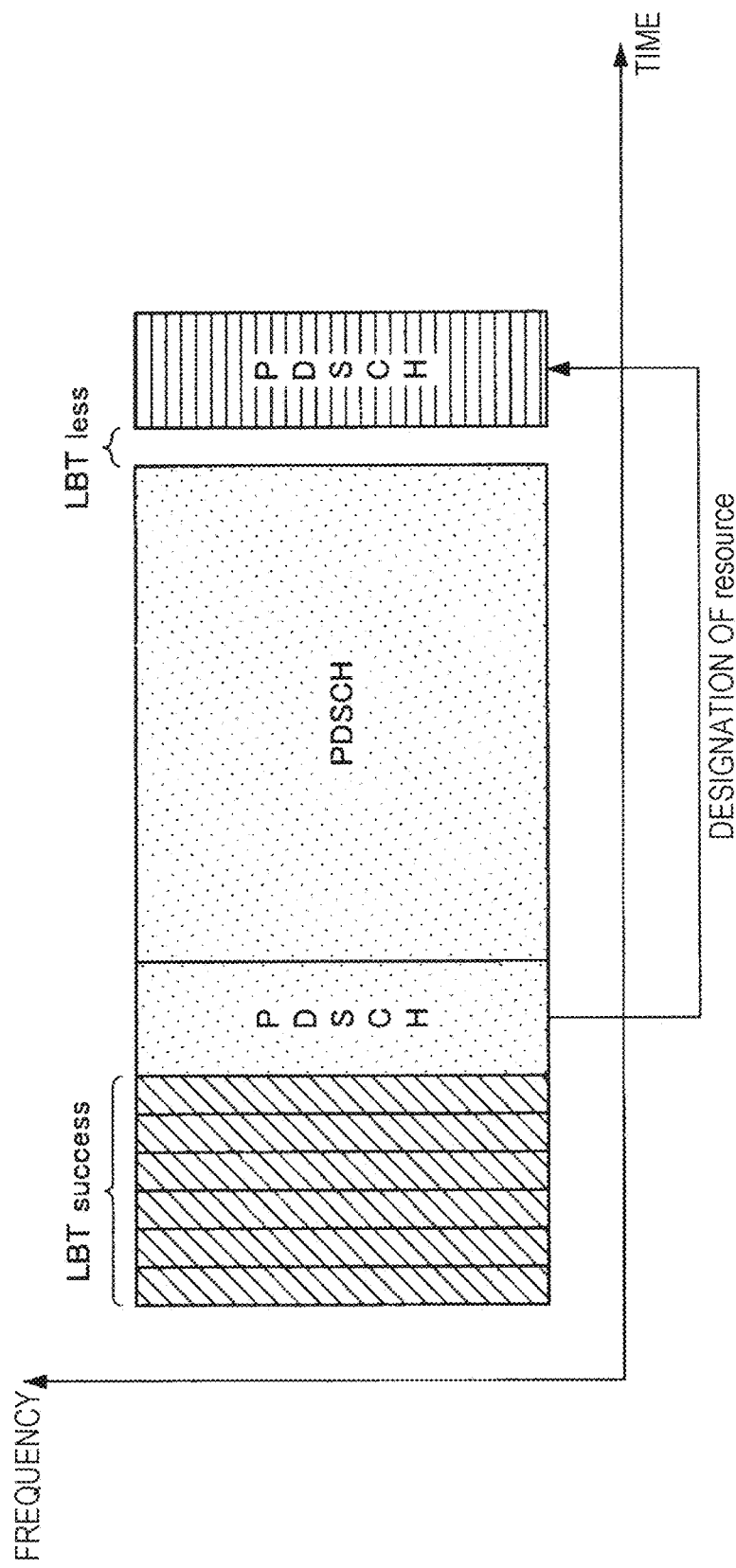
FIG. 14 is an explanatory diagram illustrating an aspect where the terminal device transmits a PUCCH with LBT less.

FIG. 14 is an explanatory diagram illustrating an aspect where the terminal device 200 transmits a PUCCH with LBT less. The terminal device 200 has to transmit a PUCCH within 16 microseconds in a case where the terminal device 200 transmits the PUCCH with LBT less. In a case where the terminal device 200 cannot transmit the PUCCH within 16 microseconds, for example, in a case where the terminal device 200 cannot prepare uplink control information (UCI) within 16 microseconds, the terminal device 200 adopts a method (2) which will be described later.

The terminal device 200 may be notified of LBT less from the base station device 100 as one type of LBT types. Even if the terminal device 200 is notified of LBT less from the base station device 100, in a case where the terminal device 200 determines that a downlink is not used by the immediately preceding resource, the terminal device 200 may perform LBT, because there can be a case where resources of the downlink may be taken halfway. In this case, the method which will be described later is adopted By adopting this method (1), the terminal device 200 does not perform LBT, and thus does not fail in LBT. In other words, a transmission failure due to LBT failure does not occur. The terminal device 200 therefore can surely transmit a PUCCH by adopting this method.

(2) Setting of a Plurality of PUCCH Transmission Occasions

Figure 15:
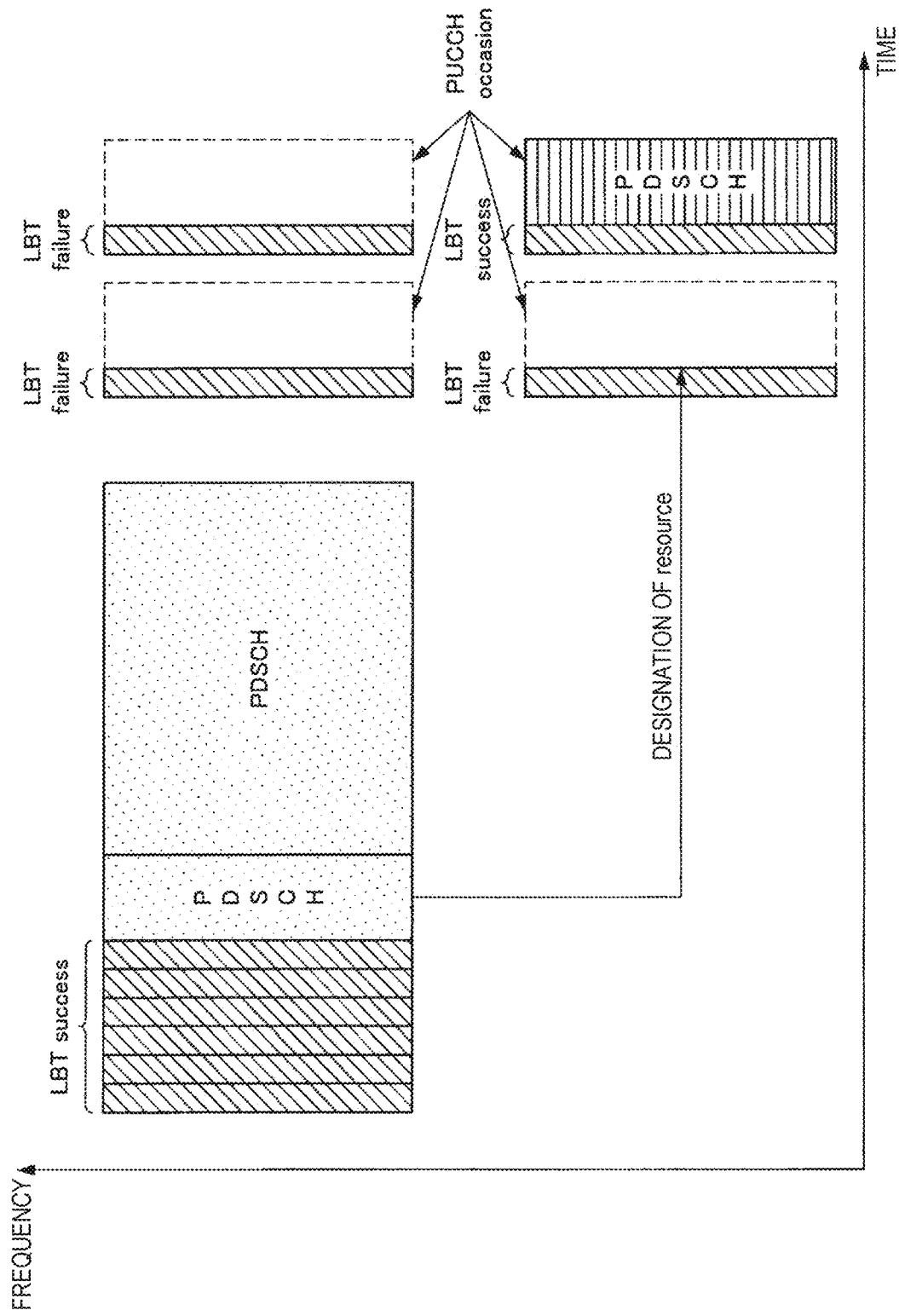
FIG. 15 is an explanatory diagram illustrating an aspect where four different PUCCH resources are set.

In this method, a plurality of different PUCCH resources (PUCCH transmission occasions) is set in advance, and the terminal device 200 transmits a PUCCH using one of the resources. The PUCCH resources can be different in a time domain and/or in a frequency domain. For example, the base station device 100 sets four different PUCCH resources in advance. The base station device 100 notifies the terminal device 200 of these different PUCCH resources through, for example, RRC signaling. FIG. 15 is an explanatory diagram illustrating an aspect where four different PUCCH resources are set. The terminal device 200 transmits a PUCCH using one PUCCH resource which has succeeded in LBT among the four PUCCH resources in a case where the terminal device 200 could not transmit the PUCCH due to LBT failure. The base station device 100 may set the PUCCH resources on a frequency axis at different carriers.

The base station device 100 sets a plurality of PUCCH transmission occasions. Times and frequencies of the respective PUCCH transmission occasions are different. The base station device 100 sets different slots to make the times of the PUCCH transmission occasions different, while setting different carriers or bandwidth parts to make the frequencies of the PUCCH transmission occasions different.

In a case where transmission becomes possible at the same time at PUCCH transmission occasions at which frequencies are different, the terminal device 200 may transmit the same PUCCH using all the resources, may select a resource in accordance with priorities determined in advance or may divide the PUCCH and transmit the divided PUCCHs using all the resources. How the terminal device 200 operates may be set from the base station device 100 or may be set at the terminal device 200 in advance. It can be expected to improve a diversity effect by transmitting the same PUCCH using all the resources. Further, it can be expected to improve coding efficiency by dividing the PUCCH and transmitting the divided PUCCHs using all the resources. Still further, in a case where a resource is selected in accordance with priorities determined in advance, the priorities may be set in ascending order of carriers or bandwidth parts.

As a method for setting different PUCCH resources, a method in which the base station device 100 notifies the terminal device 200 of a set of frequency or time resources may be used. The base station device 100 sets resources in accordance with a congestion situation. The congestion situation may be based on RRM measurement (RSSI/channel occupancy ratio) from the terminal device 200 and statistical information regarding return of PUCCHs. Further, as the method for setting different PUCCH resources, a method in which the base station device 100 sets only a time window at the terminal device 200 may be used. In a case of this method, the terminal device 200 transmits a PUCCH at a timing of LBT success.

This method sets a plurality of PUCCH resources, so that it can be expected to obtain effects of improvement in a probability of LBT success at the terminal device 200 and improvement in a probability of success in transmission of a PUCCH by the terminal device 200.

While FIG. 15 illustrates an example where four different PUCCH resources are set, the present disclosure is not limited to this example. For example, an area in which the PUCCH resources can be set in advance, like a resource pool, may be designated. The terminal device 200 may transmit a PUCCH using the area in a case where LBT is successful. Further, the base station device 100 may set a PUCCH resource for causing the terminal device 200 to transmit a PUCCH on the basis of statistics of conditions where the PUCCH resources have been selected at the terminal device 200 in the past.

(3) Scheduling of Resource for HARQ-ACK Reply with PDCCH

Figure 16:
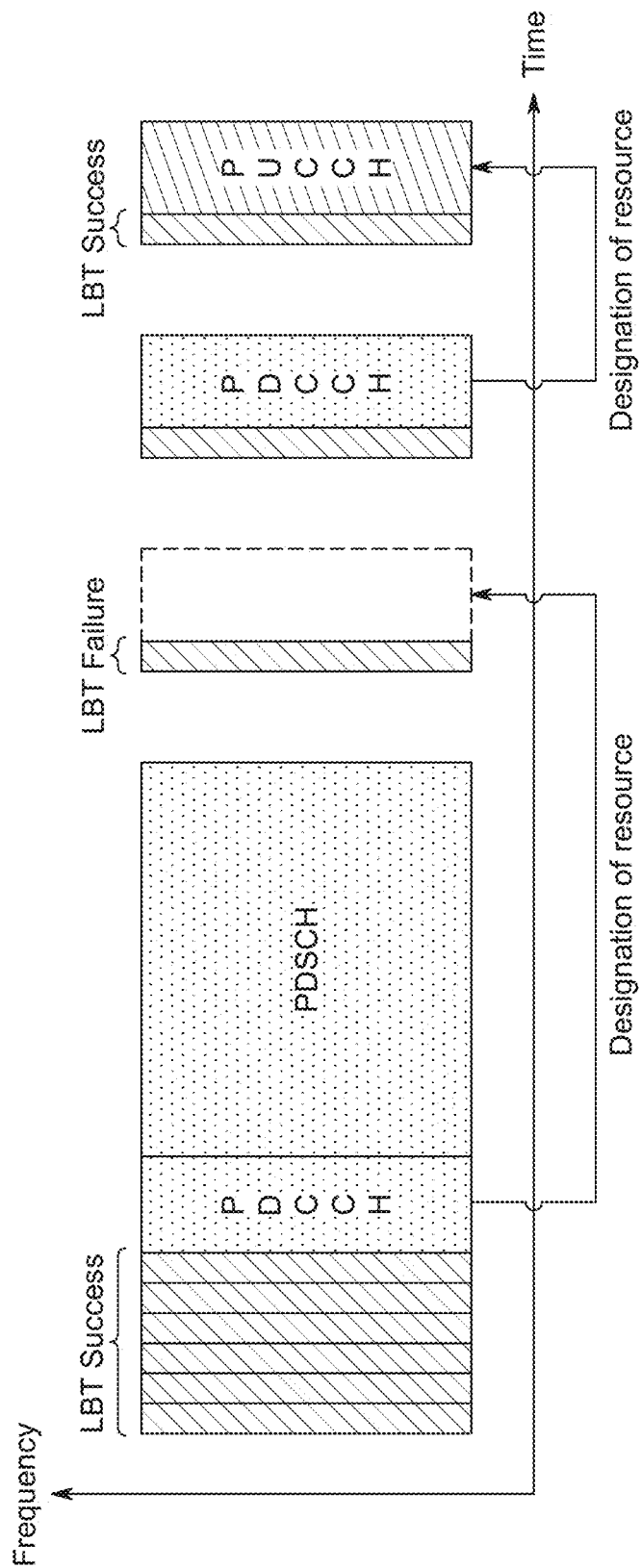
FIG. 16 is an explanatory diagram illustrating an aspect where the base station device schedules a resource for HARQ-ACK reply with a PDCCH.

The base station device 100 according to the present embodiment may schedule a resource for a HARQ-ACK reply with a PDCCH. In this case, a structure of a PUCCH or PUSCH is used for the HARQ-ACK reply. FIG. 16 is an explanatory diagram illustrating an aspect where the base station device 100 schedules a resource for a HARQ-ACK reply with a PDCCH. A PUCCH or a PDCCH includes a field for indicating information regarding allocation of bands, which is called a downlink control information (DCI) format. The resource for the HARQ-ACK reply is designated in the DCI. FIG. 16 illustrates an example where the terminal device 200 could not transmit a PUCCH with the resource designated with the first PDCCH due to LBT failure in the terminal device 200. The resource for the HARQ-ACK is designated with the next PDCCH, and, in a case where the terminal device 200 succeeds in LBT, the terminal device 200 returns the HARQ-ACK to the base station device 100 with the designated (short) PUCCH resource. Here, the resource for transmitting the PUCCH as a result of LBT failure is designated in DCI different from the DCI used by the base station device 100 to designate the resource first. The DCI of the PDCCH which designates the resource for the HARQ-ACK reply will be referred to as a UCI grant.

The PUSCH includes a UCI (Piggy back). The UCI grant thereof includes a downlink HARQ process ID instead of an uplink HARQ process ID. The terminal device 200 returns a bit of the HARQ-ACK associated with the designated downlink HARQ process ID to the base station device 100. The base station device 100 puts information regarding the HARQ to be mixed with this PDCCH into the information. For example, the base station device 100 makes a notification of information regarding a mixing rule of the HARQ (for example, priorities). The resource for the HARQ-ACK reply is preferably a mini slot, because not so many resources are required. A modulation coding scheme (MCS) of the PUCCH or the PUSCH may be fixed. Note that the mini slot is a time domain in which a physical channel/signal is to be transmitted, other than the head of the slot.

This method eliminates the need of the resource to be used by the base station device 100 to retransmit the PDSCH, so that it is possible to achieve efficient utilization of the resources. Further, this method allows the base station device 100 to dynamically reset the PUCCH resources. It can be expected that this improves a transmission success probability of the PUCCH by the terminal device 200 and improves resource efficiency.

(4) Handshaking

Figure 17:
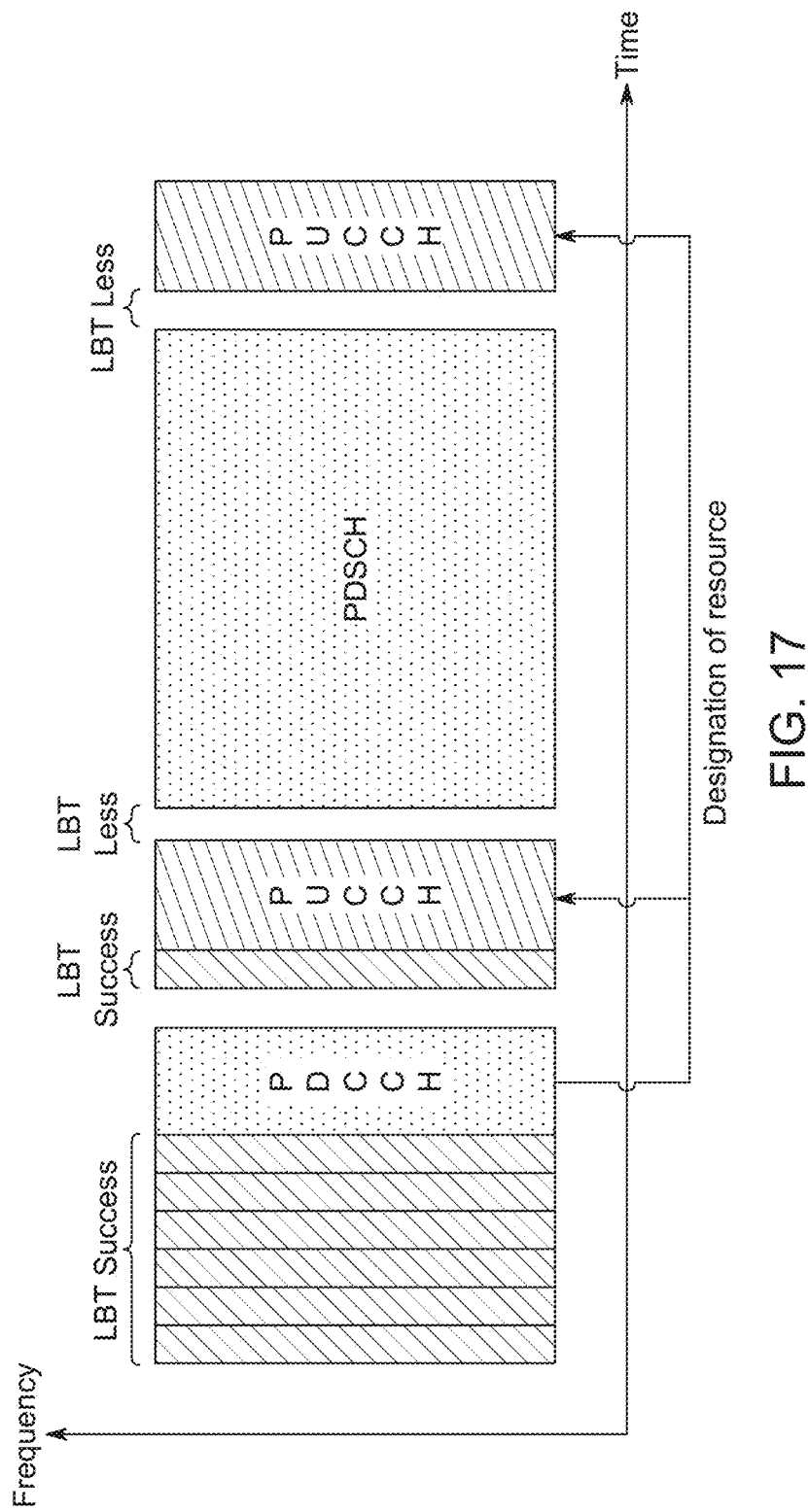
FIG. 17 is an explanatory diagram illustrating an example where the base station device designates a resource of the PUCCH in the PDCCH.

In a case where the terminal device 200 which has received the PDCCH from the base station device 100 succeeds in LBT, the terminal device 200 returns an ACK for the PDCCH to the base station device 100 with a PUCCH. The base station device 100 which has received the ACK from the terminal device 200 transmits a PDSCH. The terminal device 200 which has received the PDSCH without LBT returns an ACK for the PDSCH to the base station device 100 with a PUCCH without LBT. Here, the ACK for the PDCCH is preferably a short PUCCH. FIG. 17 is an explanatory diagram illustrating an example where the base station device 100 designates a resource of the PUCCH in the PDCCH.

This method can avoid the base station device 100 from transmitting an unnecessary PDSCH, so that improvement of resource efficiency can be expected.

Performing communication under such handshaking between the base station device 100 and the terminal device 200 enables reliable communication between the base station device 100 and the terminal device 200 using an unlicensed band.

In a case where the terminal device 200 could not transmit all the PUCCH resources associated with the bit of the HARQ-ACK, the terminal device 200 may discard the bit of the HARQ-ACK. In other words, the PDSCH corresponding to the HARQ-ACK which could not be transmitted from the terminal device 200 is retransmitted from the base station device 100.

Further, in a case where the terminal device 200 could not transmit all the PUCCH resources associated with the bit of the HARQ-ACK, the terminal device 200 may transmit the bit of the HARQ-ACK which could not be transmitted, using a PUSCH or a PUCCH if the terminal device 200 can transmit the PUSCH or the PUCCH later. The resource in this event may be a resource designated in the PDCCH or may be a resource designated from the upper layer.

In a case where the bit of the HARQ-ACK which could not be transmitted is mixed, it is necessary to perform dynamic HARQ codebook. The HARQ codebook defines sizes of boxes of a plurality of bits of the HARQ-ACK. The dynamic HARQ codebook changes sizes of boxes of a plurality of bits of the HARQ-ACK as appropriate in accordance with the total number of bits of the HARQ-ACK to be fed back.

In a case where all the PUCCH resources associated with the bit of the HARQ-ACK could not be transmitted, the HARQ-ACK corresponding to the PDSCH which has been previously transmitted may be prioritized, or the HARQ-ACK for which transmission has been primarily scheduled may be prioritized. The terminal device 200 transmits the bit of the HARQ-ACK which could not be transmitted at the next opportunity.

A method for associating the HARQ-ACK with the PDSCH in a case where the bit of the HARQ-ACK which could not be transmitted is mixed includes a method in which the base station device 100 makes a notification using, for example, DCI, and a method in which the terminal device 200 performs selection on the basis of a pre-rule. The method in which the terminal device 200 performs selection on the basis of the pre-rule further includes an implicit association method and an explicit association method. In the former case, the terminal device 200 puts the bits of the HARQ-ACK in transmission order of the PDSCHs. In a case where the bits of the HARQ-ACK are put in transmission order of the PDSCHs, the terminal device 200 may put the HARQ-ACK for which transmission has been primarily scheduled first, and may additionally put the bit of the HARQ-ACK which could not be transmitted after that. Further, in the latter case, the terminal device 200 may put the HARQ-ACK and the HARQ process ID as a set, or may put the HARQ-ACK and the designated downlink assignment index (DAI) as a set.

Note that in a case where the bit of the HARQ-ACK which could not be transmitted is mixed, limitations may be provided to the PUCCH into which the bit of the HARQ-ACK may be mixed. For example, limitations which allow mixing into a periodic PUCCH while not allowing mixing into a dynamic (aperiodic) PUCCH may be provided. A method for mixing the CSI and the HARQ includes a method in which the CSI is prioritized, and a method in which the HARQ is prioritized. In the former case, the terminal device 200 puts the HARQ-ACK which could not be transmitted in space which is left after the CSI is put.

The terminal device 200 may discard the bit of the HARQ-ACK in a case where the resource for transmitting the PUSCH or the PUCCH cannot be acquired even after a predetermined period has elapsed. This predetermined period may be set from the base station device 100 through dedicated RRC signaling. A fixed period for the PUCCH of Message 4 is set in a system information block (SIB).

A size of a contention window in a case where the HARQ-ACK of the head slot in a channel occupancy time (COT) is not returned may be determined as follows by the base station device 100. For example, the base station device 100 may determine a wrong size as the size of the contention window. Further, the base station device 100 may refrain from reflection in calculation until the HARQ-ACK is returned. Still further, in a case where a HARQ-ACK for the second or subsequent slots is returned, the base station device 100 may calculate the size of the contention window using the HARQ-ACK.

Subsequently, a configuration of the PUCCH which supports the NR-U will be described.

Figure 18:
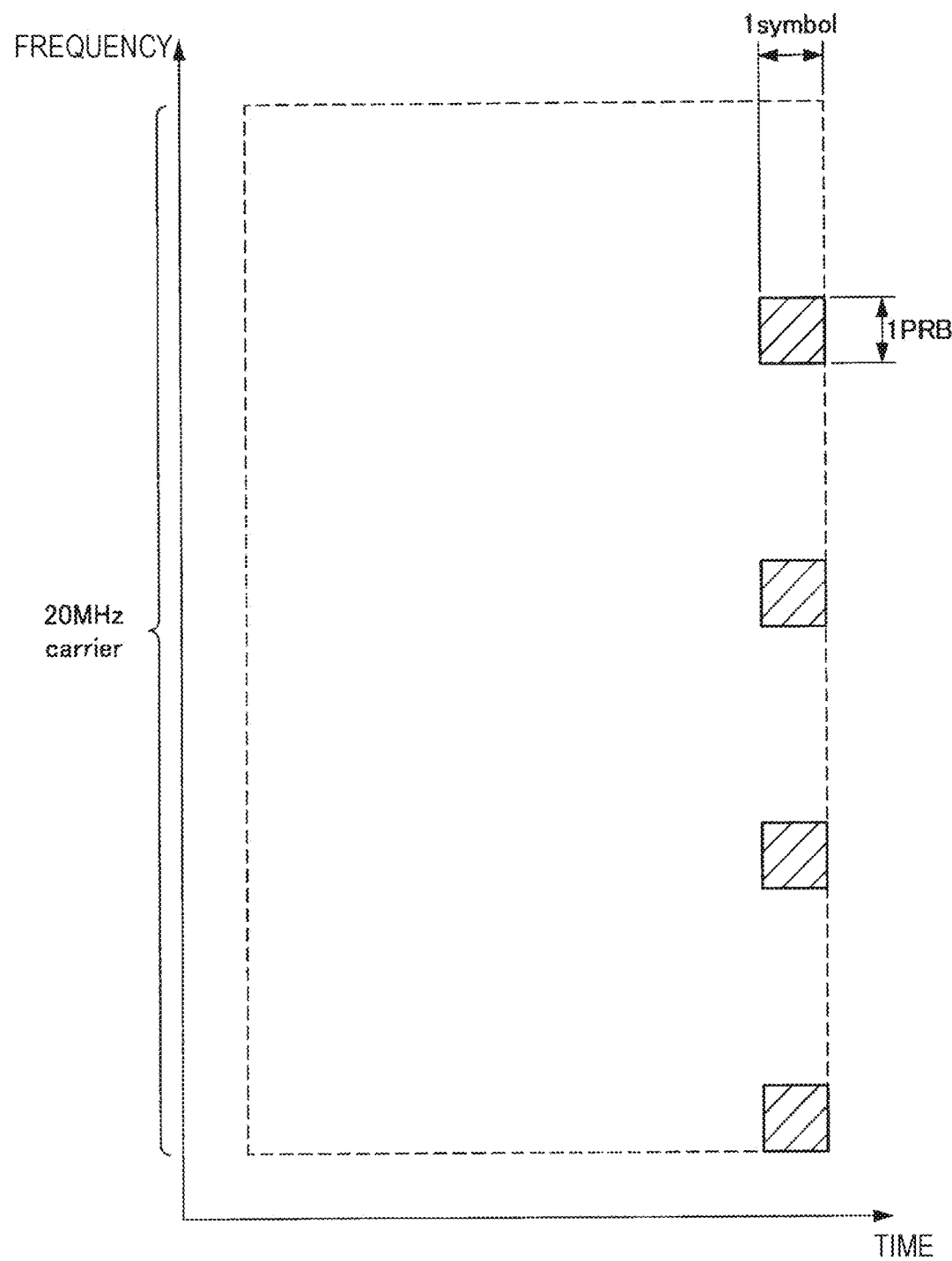
FIG. 18 is an explanatory diagram illustrating a configuration example of a PUCCH which supports NR-U.

The PUCCH which supports the NR-U may be constituted on the basis of the PUCCH format 0. In this case, frequency resources may be allocated in an interlaced manner in unit of 1 PRB. Thus, the same signal is repeatedly transmitted on a frequency. FIG. 18 is an explanatory diagram illustrating a configuration example of the PUCCH which supports the NR-U.

Figure 19:
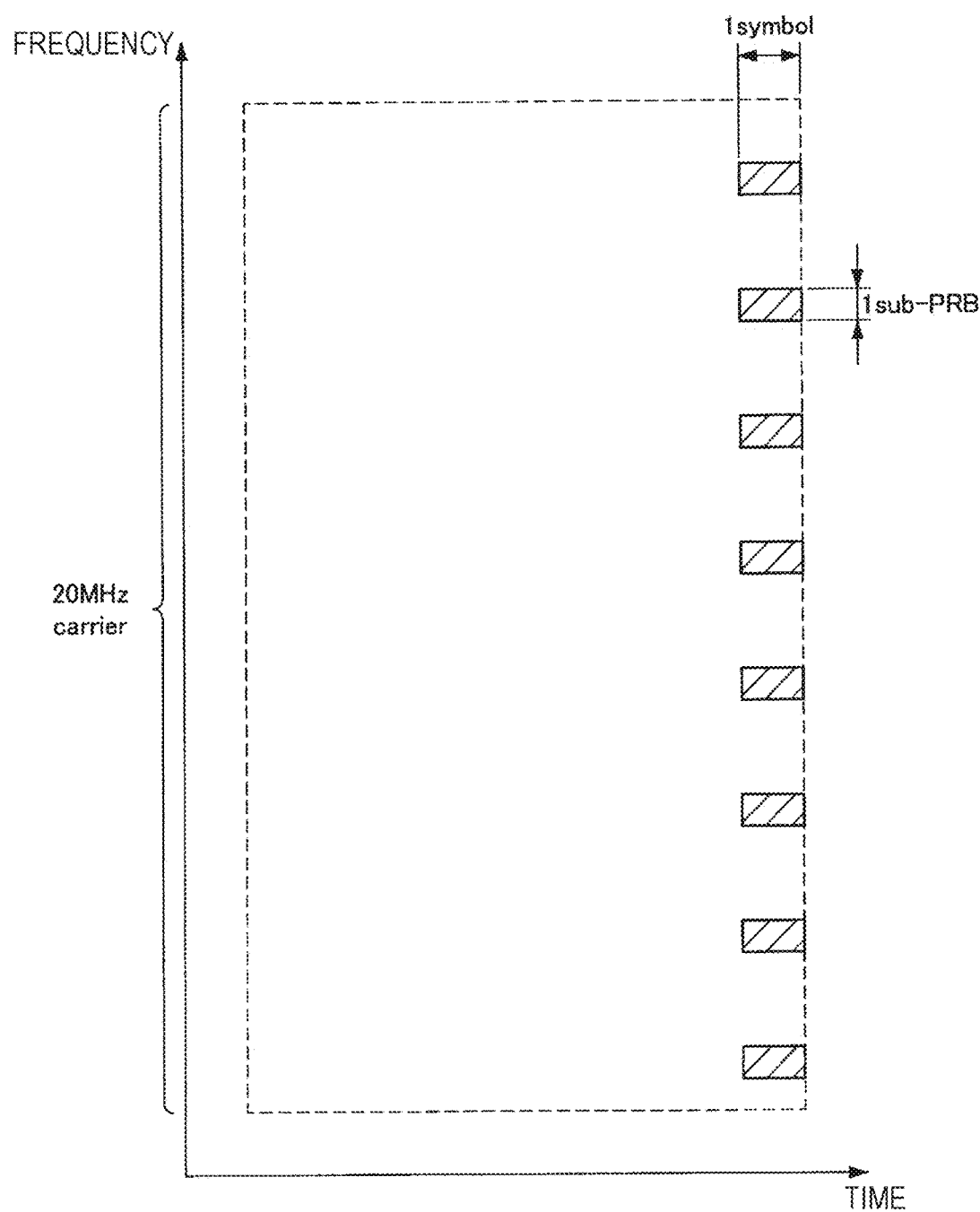
FIG. 19 is an explanatory diagram illustrating a configuration example of a PUCCH which supports NR-U.

The PUCCH which supports the NR-U may be constituted on the basis of the PUCCH format 0. In this case, frequency resources may be allocated in an interlaced manner in unit of 1sub-PRB. Such allocation of the frequency resources enables allocation of resources in small unit, so that improvement of resource efficiency can be expected. FIG. 19 is an explanatory diagram illustrating a configuration example of the PUCCH which supports the NR-U.

Figure 20:
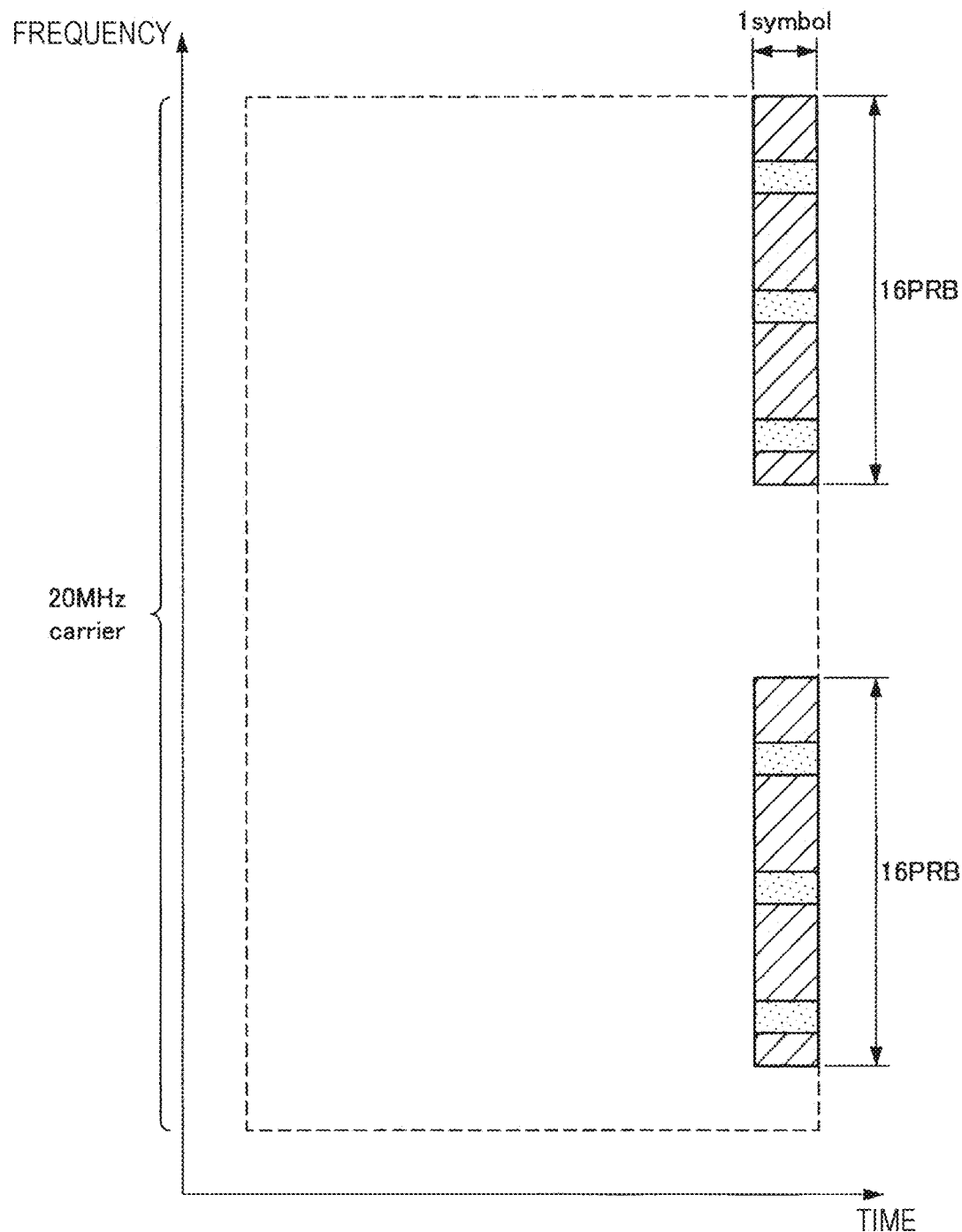
FIG. 20 is an explanatory diagram illustrating a configuration example of a PUCCH which supports NR-U.

The PUCCH which supports the NR-U may be constituted on the basis of the PUCCH format 2. In this case, frequency resources are allocated in an interlaced manner in unit of resource blocks set in the PUCCH format 2. Thus, the same signal is repeatedly transmitted on a frequency. FIG. 20 is an explanatory diagram illustrating a configuration example of the PUCCH which supports the NR-U.

Figure 21:
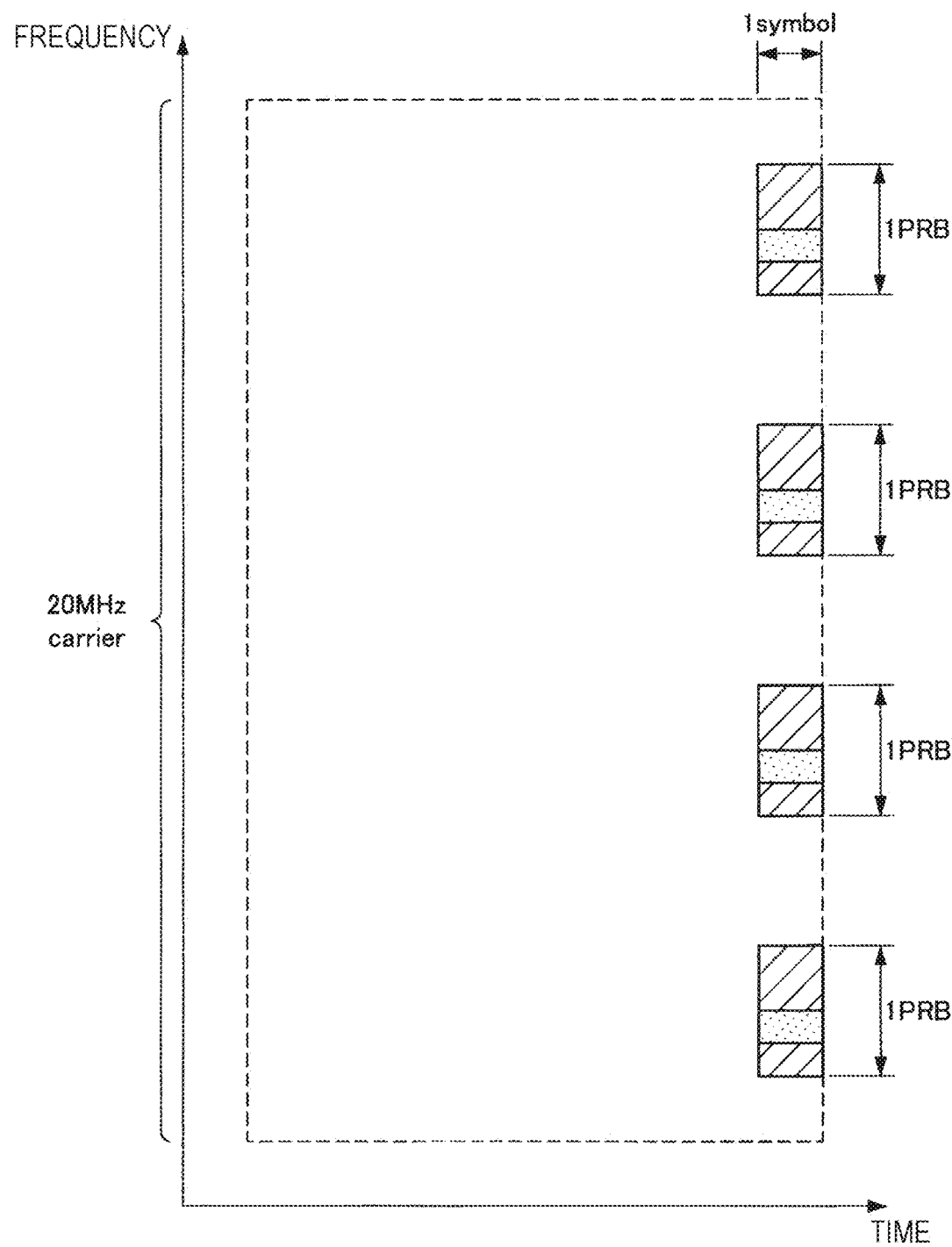
FIG. 21 is an explanatory diagram illustrating a configuration example of a PUCCH which supports NR-U.

The PUCCH which supports the NR-U may be constituted on the basis of the PUCCH format 2. In this case, frequency resources are allocated in an interlaced manner in unit of one resource block. Such allocation of the frequency resources enables allocation of resources in small unit, so that improvement of resource efficiency can be expected. FIG. 21 is an explanatory diagram illustrating a configuration example of the PUCCH which supports the NR-U.

Figure 22:
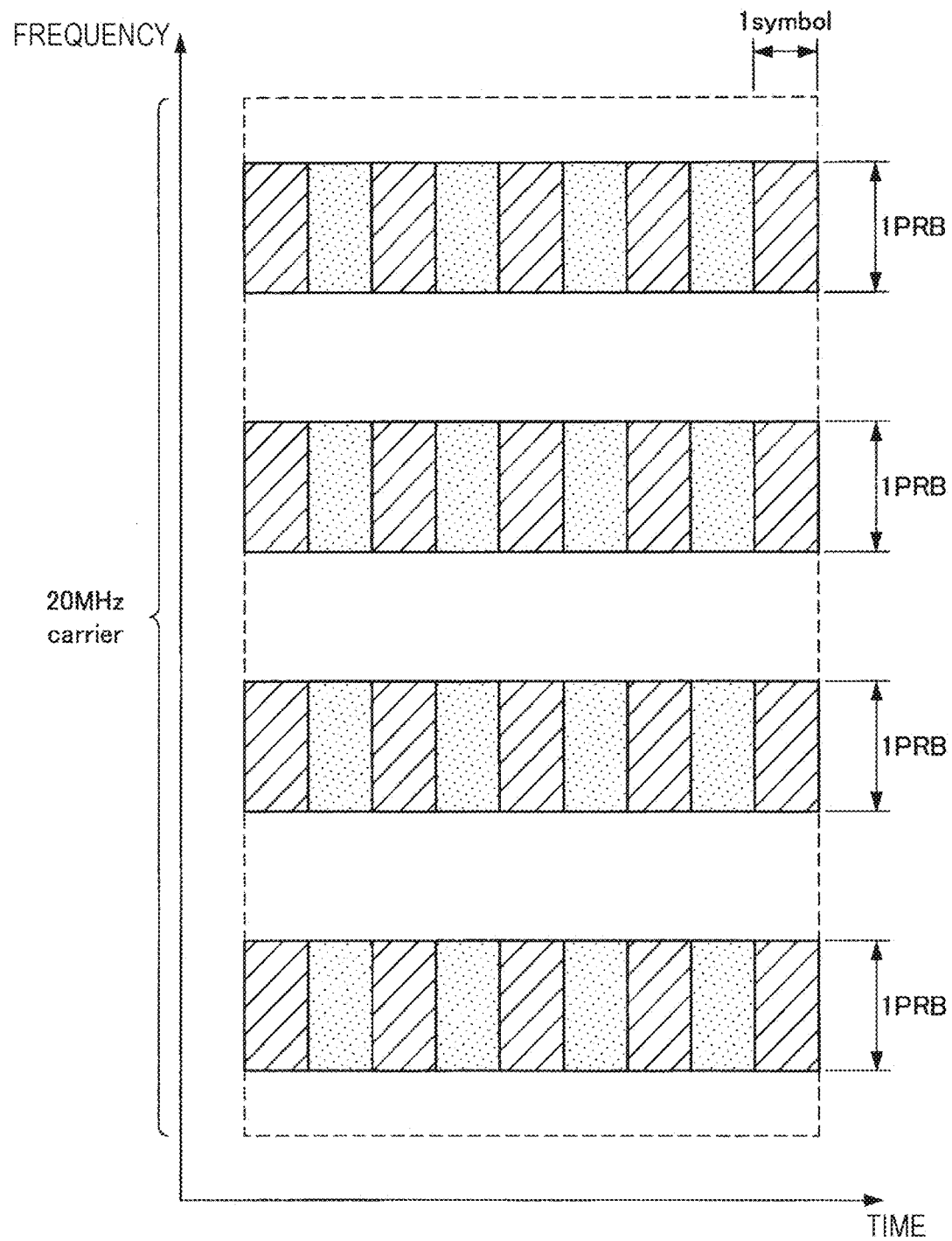
FIG. 22 is an explanatory diagram illustrating a configuration example of a PUCCH which supports NR-U.

The PUCCH which supports the NR-U may be constituted on the basis of the PUCCH format 1. In this case, frequency resources may be allocated in an interlaced manner in unit of 1 PRB. Thus, the same signal is repeatedly transmitted on a frequency. FIG. 22 is an explanatory diagram illustrating a configuration example of the PUCCH which supports the NR-U.

Figure 23:
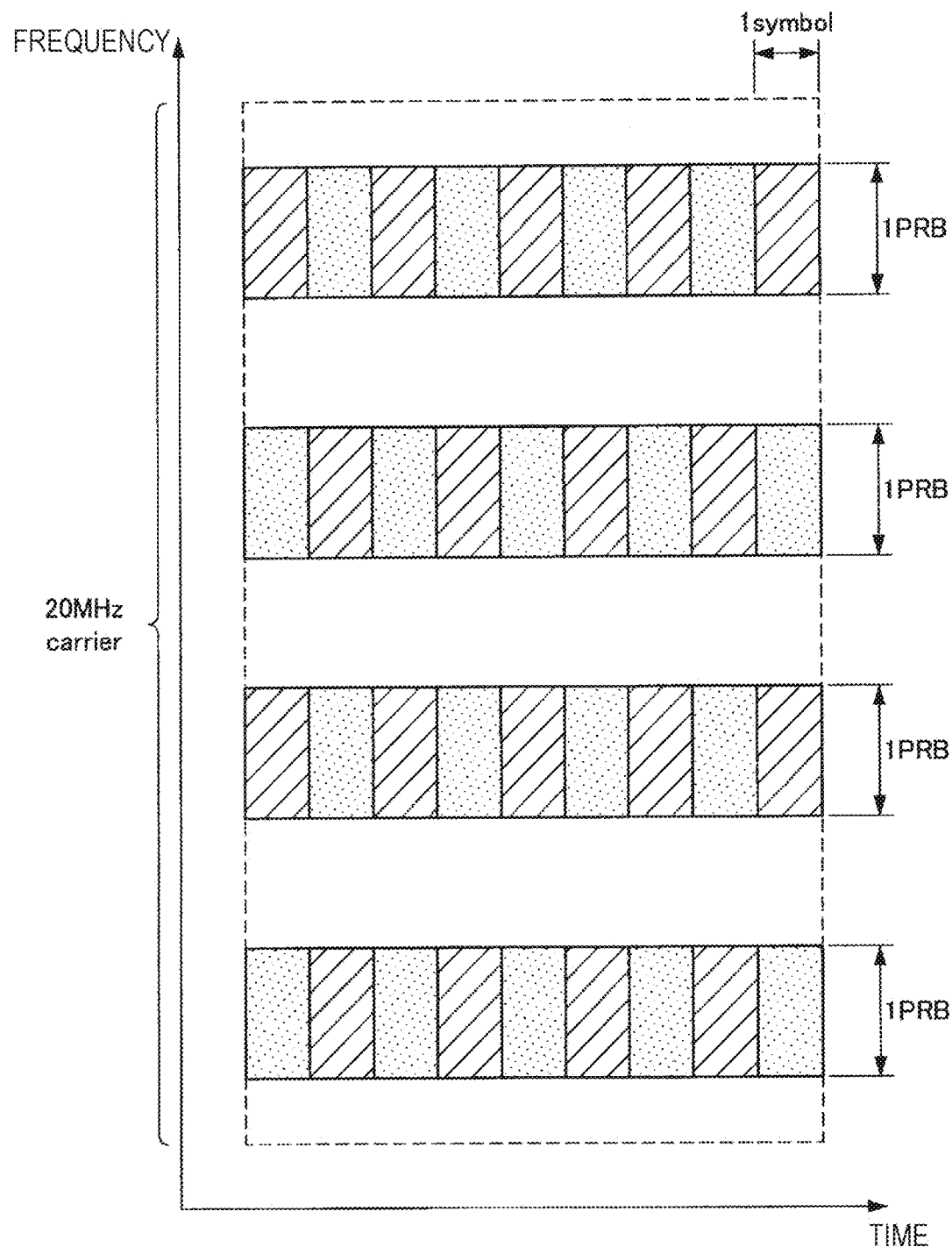
FIG. 23 is an explanatory diagram illustrating a configuration example of a PUCCH which supports NR-U.

The PUCCH which supports the NR-U may be constituted on the basis of the PUCCH format 1. In this case, frequency resources may be allocated in an interlaced manner in unit of 1 PRB. FIG. 23 is an explanatory diagram illustrating a configuration example of the PUCCH which supports the NR-U. The example illustrated in FIG. 23 is different from the case illustrated in FIG. 22 in symbol arrangement of the DMRS of the PUCCH. As a result of frequency resources being allocated in this manner, improvement of channel estimation characteristics can be expected.

Figure 24:
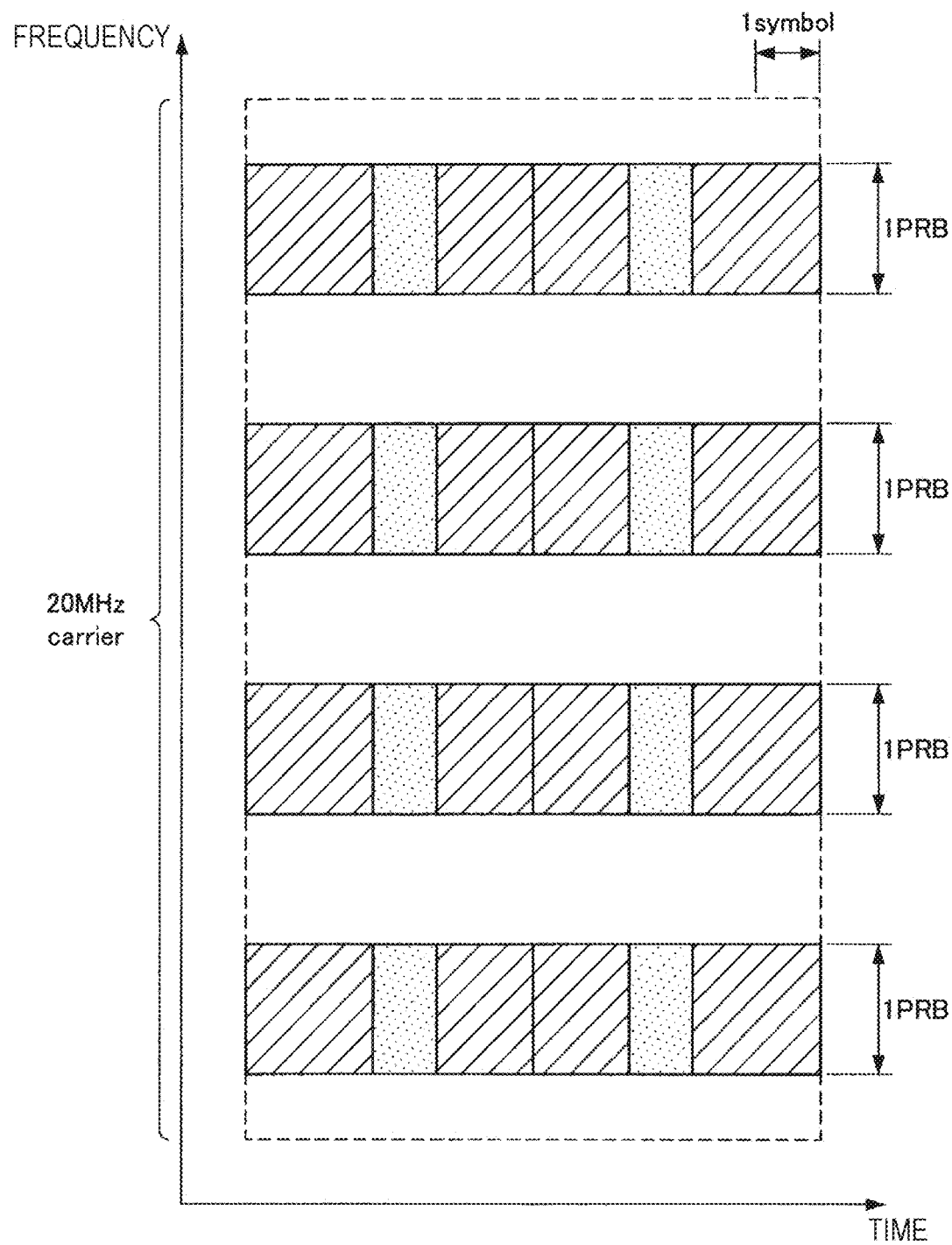
FIG. 24 is an explanatory diagram illustrating a configuration example of a PUCCH which supports NR-U.

The PUCCH which supports the NR-U may be constituted on the basis of the PUCCH formats 3 and 4. In this case, frequency resources may be allocated in an interlaced manner in unit of 1 PRB. Thus, the same signal is repeatedly transmitted on a frequency. FIG. 24 is an explanatory diagram illustrating a configuration example of the PUCCH which supports the NR-U.

Figure 25:
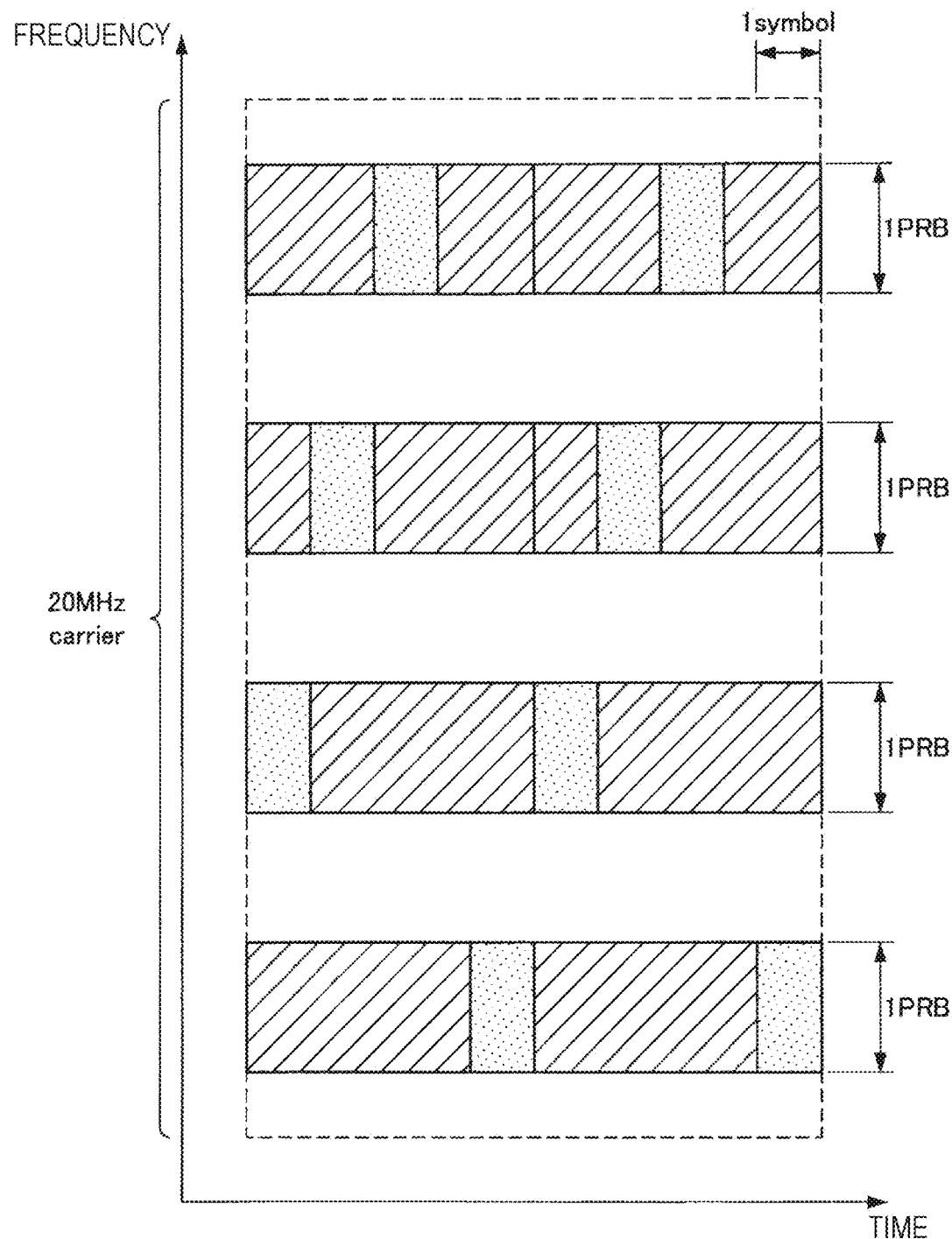
FIG. 25 is an explanatory diagram illustrating a configuration example of a PUCCH which supports NR-U.

The PUCCH which supports the NR-U may be constituted on the basis of the PUCCH formats 3 and 4. In this case, frequency resources may be allocated in an interlaced manner in unit of 1 PRB. FIG. 25 is an explanatory diagram illustrating a configuration example of the PUCCH which supports the NR-U. The example illustrated in FIG. 25 is different from the case illustrated in FIG. 24 in symbol arrangement of the DMRS of the PUCCH. As a result of frequency resources being allocated in this manner, improvement of channel estimation characteristics can be expected.

By executing such operations, the base station device 100 and the terminal device 200 are capable of using resources efficiently in an NR-U. Among the configuration of the base station device 100 illustrated in FIG. 12, the setting unit 151 sets the various settings described above for using resources efficiently in an NR-U. Additionally, the communication processing unit 153 executes a process of notifying the terminal device 200 of the content set by the setting unit 151. Additionally, among the configuration of the terminal device 200 illustrated in FIG. 13, the information acquisition unit 241 acquires various settings transmitted from the base station device 100. The communication processing unit 243 executes a process of communicating wirelessly with the base station device 100 in an NR-U on the basis of the various settings acquired by the information acquisition unit 241.

[1.5. Others]

<Allocation of Time Resources>

A time resource of the PUCCH is designated by information regarding a PDSCH-HARQ feedback timing indicator included in downlink DCI. The terminal device is notified of the number of slots between a slot in which a PDCCH which schedules a PDSCH is received and a PUCCH resource, with an index using the PDSCH-HARQ feedback timing indicator.

Examples of definition of the slot which is notified using the PDSCH-HARQ feedback timing indicator can include a slot index defined in a system. In other words, a slot is defined as a slot index which indexes the head slot of a radio frame as the 0-th slot.

In NR operated in a licensed band, time resources are allocated using the slot index (physical slot index) defined in the system.

Examples of the number of slots which is notified using the PDSCH-HARQ feedback timing indicator can include a virtual slot index. Examples of the virtual slot index in the NR-U can include a slot index which indexes only slots within the COT. In other words, slots outside the COT are not counted as slot indexes. Further, as an example of the virtual slot index in the NR-U, a slot index which indexes only slots outside the COT may be employed. In other words, slots within the COT are distinguished from slots outside the COT.

Use of the virtual slot index controls the terminal device to always transmit an uplink signal within the COT or outside the COT.

The terminal device may be notified of the virtual slot index from the base station device using a PDCCH. The PDCCH may include information regarding the COT (such as a downlink COT, an uplink COT and a length of the COT). A notification of the virtual slot index may be made using DAI.

Further, a notification of a virtual system frame number (SFN) may be made. A notification of the virtual system frame number may be made using a PBCH included in a discovery signal. The virtual system frame number may be an offset value from a system frame number (physical system frame number) defined in the system.

The base station device can instruct the terminal device to transmit the HARQ-ACK outside the COT or transmit the HARQ-ACK within the COT, using the DCI. The terminal device identifies a HARQ-ACK transmission timing on the basis of the above-described virtual slot index.

2. APPLICATION EXAMPLES

The technology according to the present disclosure can be applied to various products. For example, the base station device 100 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 100 may be realized as another type of base station such as a NodeB or a base transceiver station (BTS). The base station device 100 may include a main entity (also referred to as a base station device) that controls wireless communication and one or more remote radio heads (RRHs) disposed at different locations from the main entity. Further, various types of terminals to be described later may operate as the base station device 100 by performing a base station function temporarily or semi-permanently.

Further, for example, the terminal device 200 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 200 may be realized as a terminal that performs machine to machine (M2M) communication (also referred to as a machine type communication (MTC) terminal). Moreover, the terminal device 200 may be a wireless communication module mounted on the terminal (for example, an integrated circuit module configured on one die).

2.1. Application Examples for Base Station Device

First Application Example

Figure 26:
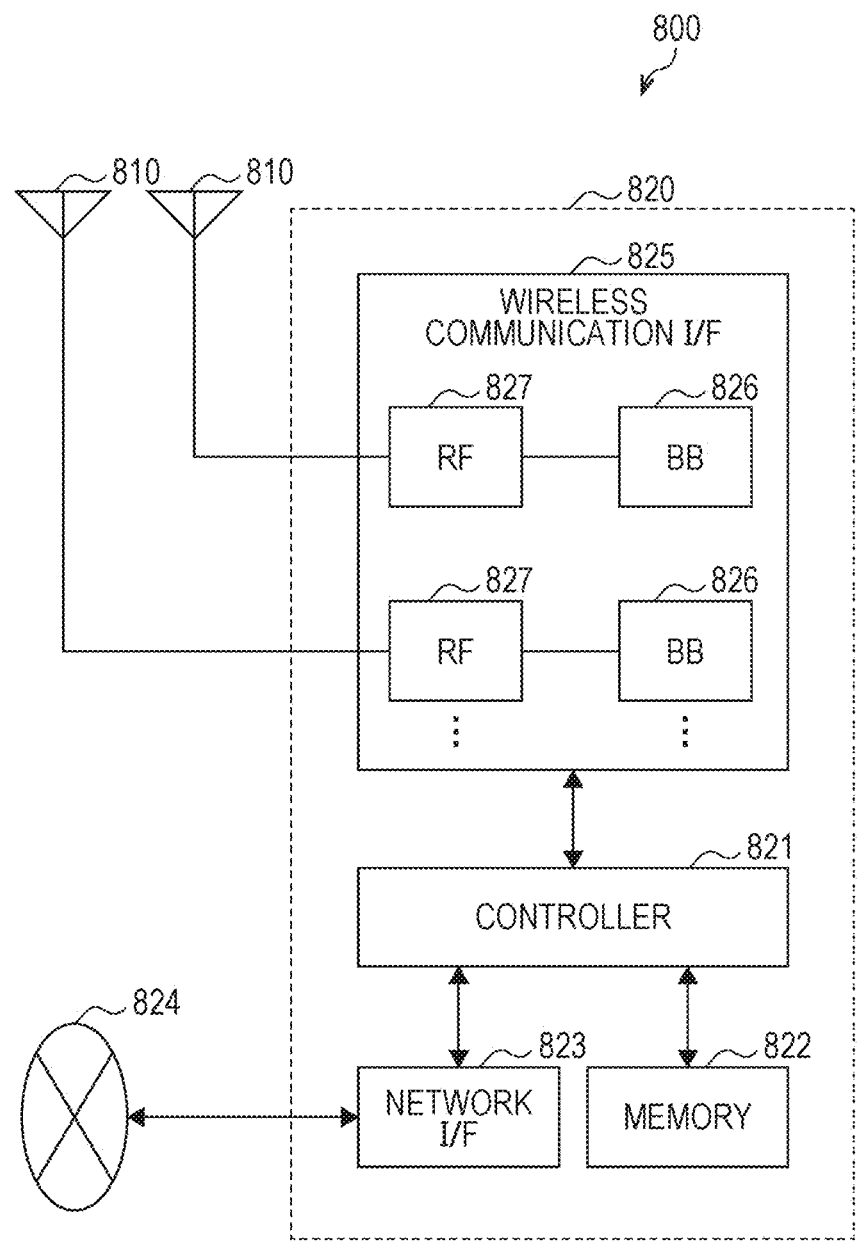
FIG. 26 is a block diagram illustrating a first example of a schematic configuration of an eNB to which the technology according to the present disclosure is applied.

FIG. 26 is a block diagram illustrating a first example of a schematic configuration of an eNB to which the technology according to the present disclosure is applied. An eNB 800 includes one or more antennas 810 and a base station device 820. Each antenna 810 and the base station device 820 may be connected to each other via an RF cable.

Each of the antennas 810 includes a single or a plurality of antenna elements (e.g., a plurality of antenna elements constituting a MIMO antenna) and is used for the base station device 820 to transmit and receive a wireless signal. The eNB 800 may include the plurality of the antennas 810 as illustrated in FIG. 26, and the plurality of antennas 810 may, for example, correspond to a plurality of frequency bands used by the eNB 800. It should be noted that while FIG. 26 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 26, and the plurality of BB processors 826 may, for example, correspond to a plurality of frequency bands used by the eNB 800. Further, the wireless communication interface 825 may also include a plurality of the RF circuits 827, as illustrated in FIG. 26, and the plurality of RF circuits 827 may, for example, correspond to a plurality of antenna elements. Note that FIG. 26 illustrates an example in which the wireless communication interface 825 includes the plurality of BB processors 826 and the plurality of RF circuits 827, but the wireless communication interface 825 may include the single BB processor 826 or the single RF circuit 827.

One or more constituent elements (the setting unit 151 and/or the communication processing unit 153) included in the control unit 150 described with reference to FIG. 12 may be implemented in the wireless communication interface 825 in the eNB 800 shown in FIG. 26. Alternatively, at least some of these constituent elements may be implemented in the controller 821. As an example, the eNB 800 may be equipped with a module including a part (for example, the BB processor 826) or all of the wireless communication interface 825 and/or the controller 821, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the eNB 800 and executed by the wireless communication interface 825 (for example, the BB processor 826) and/or the controller 821. As described above, the eNB 800, the base station device 820, or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, the wireless communication unit 120 described with reference to FIG. 12 may be implemented in the wireless communication interface 825 (for example, the RF circuit 827) in the eNB 800 shown in FIG. 26. In addition, the antenna unit 110 may be implemented on the antenna 810. Moreover, the network communication unit 130 may be implemented in the controller 821 and/or the network interface 823. Furthermore, the storage unit 140 may be implemented in the memory 822.

Figure 27:
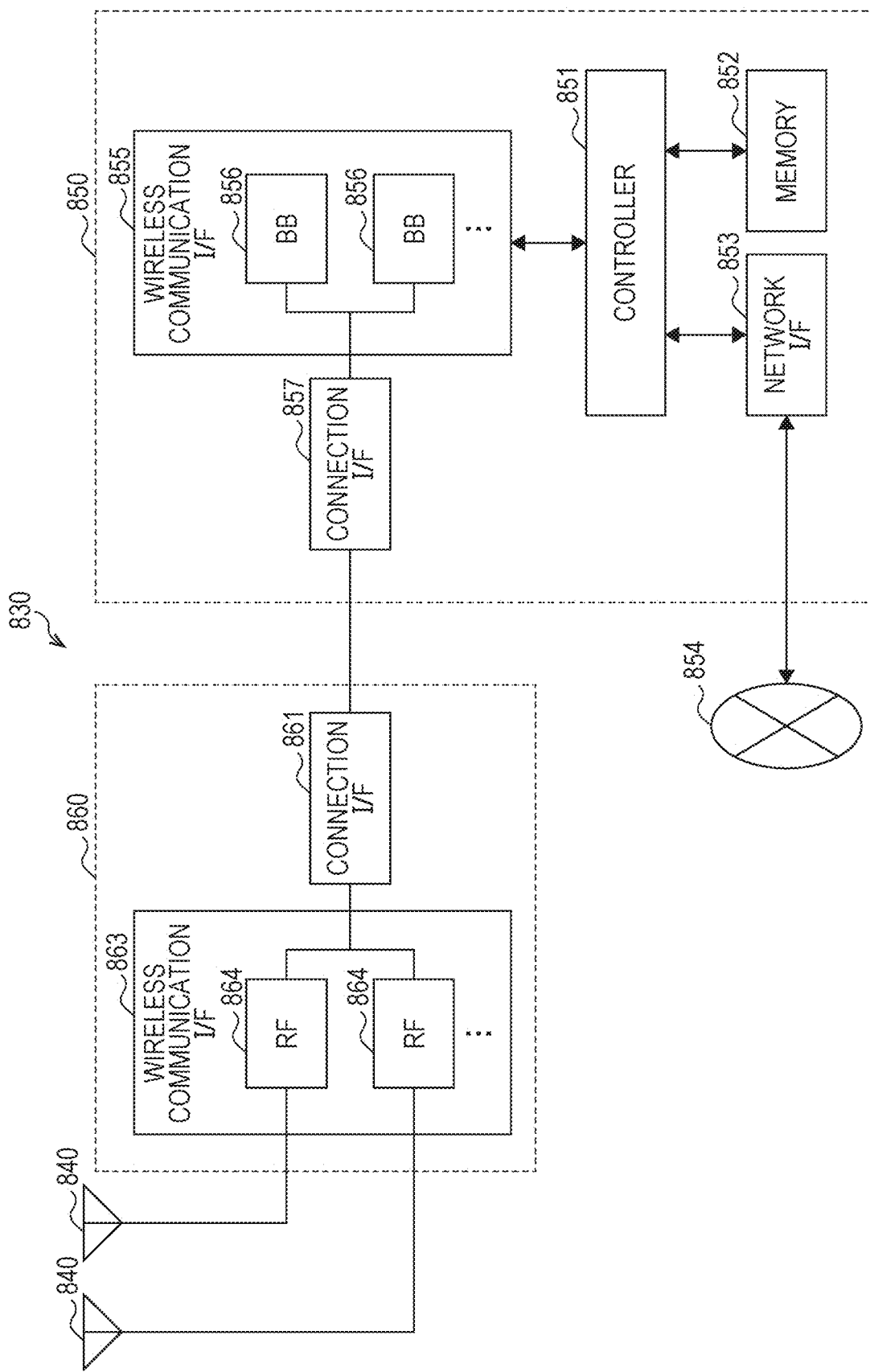
FIG. 27 is a block diagram illustrating a second example of a schematic configuration of an eNB to which the technology according to the present disclosure is applied.

(Second application example) FIG. 27 is a block diagram showing a second example of the schematic configuration of the eNB to which the technology according to the present disclosure can be applied. An eNB 830 includes one or more antennas 840, a base station device 850, and an RRH 860. Each antenna 840 and the RRH 860 can be connected to each other via an RF cable. Furthermore, the base station device 850 and the RRH 860 can be connected to each other via a high-speed line such as an optical fiber cable.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 27, and the plurality of antennas 840 may, for example, correspond to a plurality of frequency bands used by the eNB 830. Note that FIG. 27 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 16.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 26 except that the BB processor 856 is connected to an RF circuit 864 of the RRH 860 via the connection interface 857. The wireless communication interface 855 may include a plurality of the BB processors 856, as illustrated in FIG. 27, and the plurality of BB processors 856 may, for example, correspond to a plurality of frequency bands used by the eNB 830. Note that FIG. 27 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 27, and the plurality of RF circuits 864 may, for example, correspond to a plurality of antenna elements. Note that FIG. 27 illustrates an example in which the wireless communication interface 863 includes the plurality of RF circuits 864, but the wireless communication interface 863 may include the single RF circuit 864.

One or more constituent elements (the setting unit 151 and/or the communication processing unit 153) included in the control unit 150 described with reference to FIG. 12 may be implemented in the wireless communication interface 855 and/or the wireless communication interface 863 in the eNB 830 shown in FIG. 27. Alternatively, at least some of these constituent elements may be implemented in the controller 851. As an example, the eNB 830 may be equipped with a module including a part (for example, the BB processor 856) or all of the wireless communication interface 855 and/or the controller 851, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the eNB 830 and executed by the wireless communication interface 855 (for example, the BB processor 856) and/or the controller 851. As described above, the eNB 830, the base station device 850, or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 120 described with reference to FIG. 12 may be implemented in the wireless communication interface 863 (for example, the RF circuit 864) in the eNB 830 shown in FIG. 27. In addition, the antenna unit 110 may be implemented on the antenna 840. Moreover, the network communication unit 130 may be implemented in the controller 851 and/or the network interface 853. Furthermore, the storage unit 140 may be implemented in the memory 852.

2.2. Application Examples for Terminal Device

First Application Example

Figure 28:
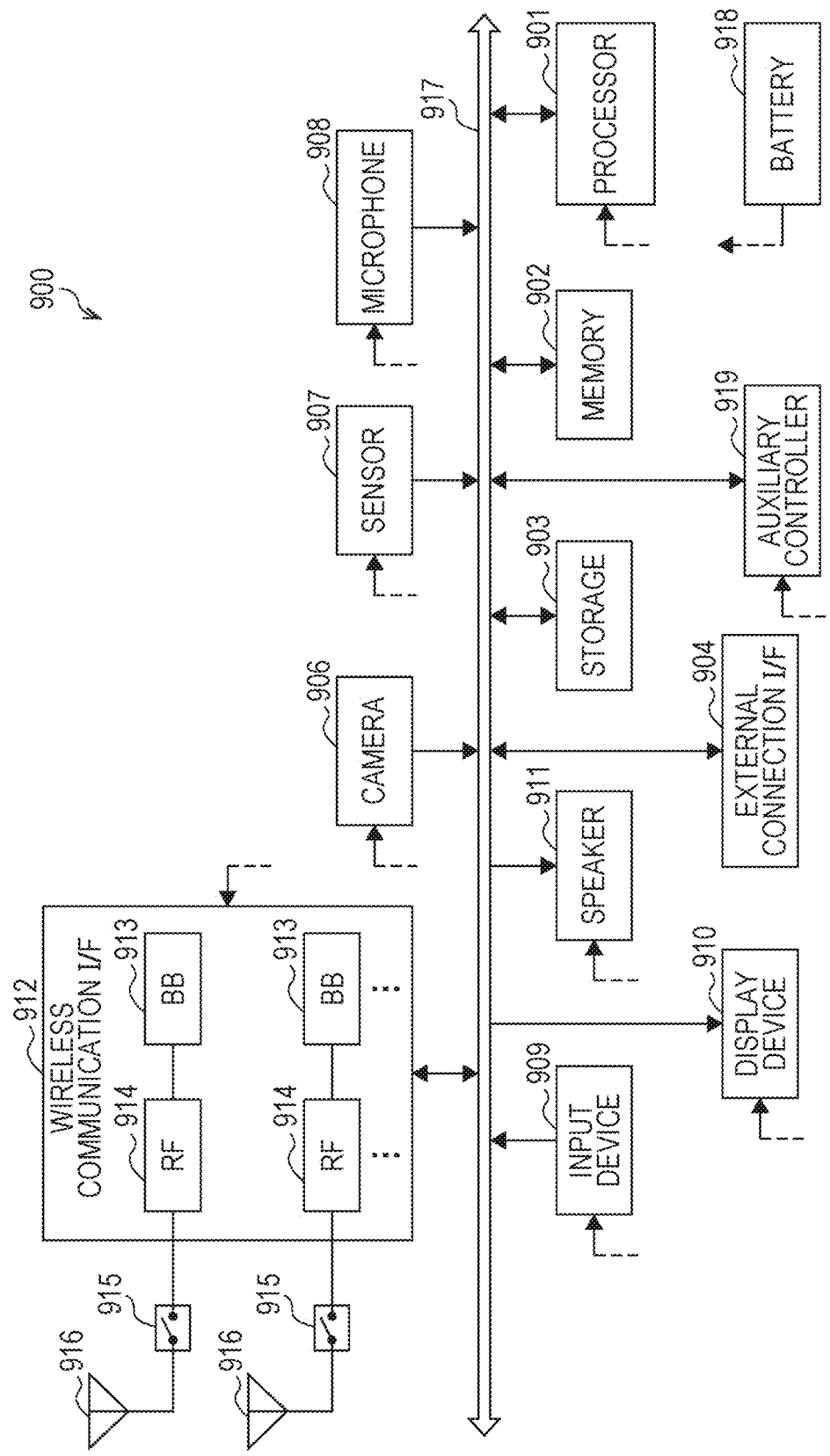
FIG. 28 is a block diagram illustrating an example of a schematic configuration of a smartphone to which the technology according to the present disclosure is applied.

FIG. 28 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 28. Note that FIG. 28 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 28. Note that FIG. 28 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 28 via a feeder line that is partially illustrated in the figure as a dashed line. The auxiliary controller 919, for example, operates a minimally necessary function of the smartphone 900 in a sleep mode.

One or more constituent elements (a measurement report unit 241 and/or the communication processing unit 243) included in the control unit 240 described with reference to FIG. 13 may be implemented in the wireless communication interface 912 in the smartphone 900 shown in FIG. 28. Alternatively, at least some of these constituent elements may be implemented in the processor 901 or the auxiliary controller 919. As an example, the smartphone 900 may be equipped with a module including a part (for example, the BB processor 913) or all of the wireless communication interface 912, the processor 901, and/or the auxiliary controller 919, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the smartphone 900 and executed by the wireless communication interface 912 (for example, the BB processor 913), the processor 901, and/or the auxiliary controller 919. As described above, the smartphone 900 or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 220 described with reference to FIG. 13 may be implemented in the wireless communication interface 912 (for example, the RF circuit 914) in the smartphone 900 shown in FIG. 28. In addition, the antenna unit 210 may be implemented on the antenna 916. Furthermore, the storage unit 230 may be implemented in the memory 902.

Second Application Example

Figure 29:
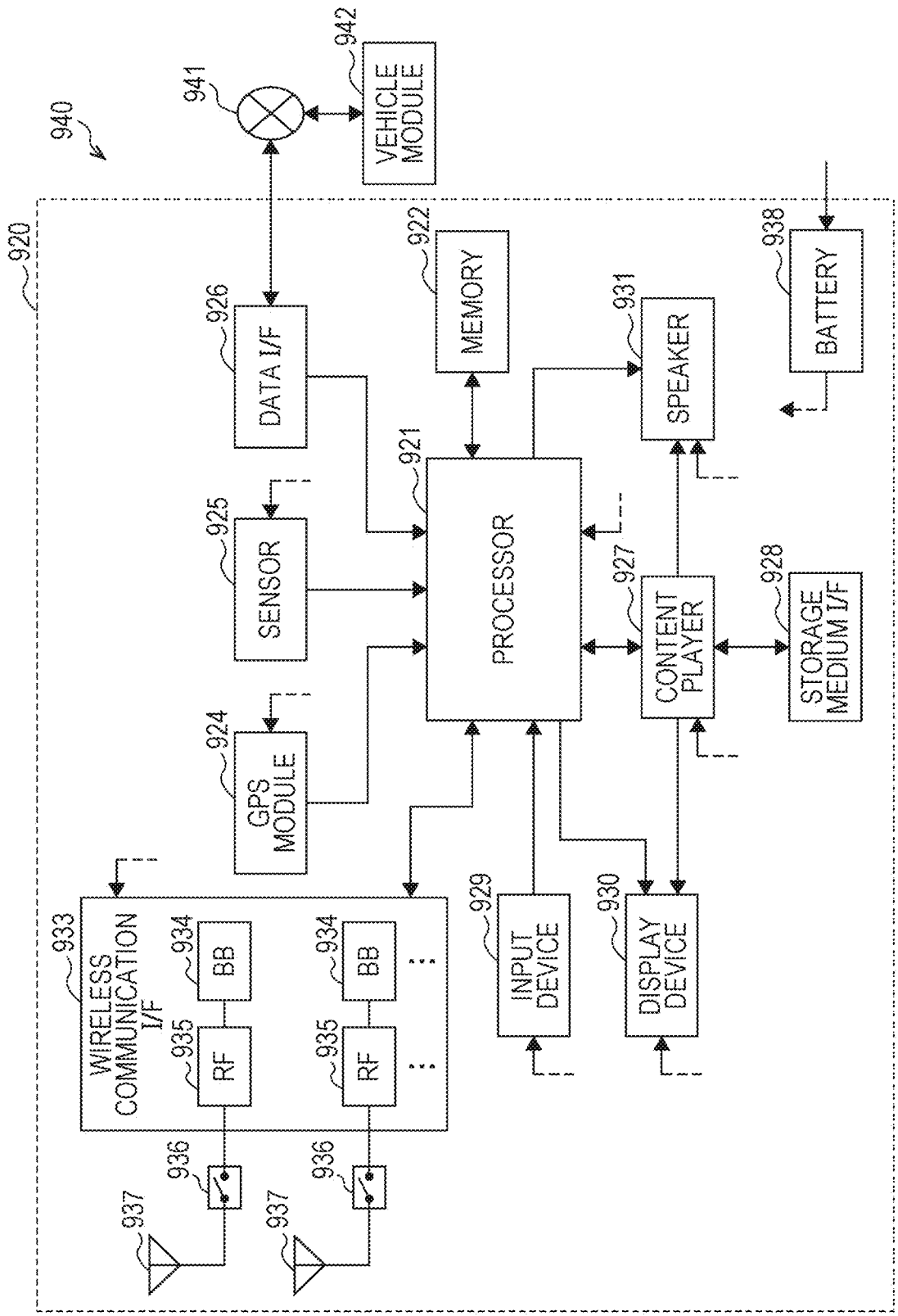
FIG. 29 is a block diagram illustrating an example of a schematic configuration of a car navigation device to which the technology according to the present disclosure is applied.

FIG. 29 is a block diagram illustrating an example of a schematic configuration of a car navigation device 920 to which the technology according to the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation device 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation device 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 29. Note that FIG. 29 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation device 920 may include a plurality of antennas 937 as illustrated in FIG. 29. Note that FIG. 29 illustrates an example in which the car navigation device 920 includes a plurality of antennas 937, but the car navigation device 920 may include a single antenna 937.

Further, the car navigation device 920 may include the antenna 937 for each wireless communication system. In this case, the antenna switch 936 may be omitted from a configuration of the car navigation device 920.

The battery 938 supplies electric power to each block of the car navigation device 920 illustrated in FIG. 29 via a feeder line that is partially illustrated in the figure as a dashed line. Further, the battery 938 accumulates the electric power supplied from the vehicle.

One or more constituent elements (the measurement report unit 241 and/or the communication processing unit 243) included in the control unit 240 described with reference to FIG. 13 may be implemented in the wireless communication interface 933 in the car navigation device 920 shown in FIG. 29. Alternatively, at least some of these constituent elements may be implemented in the processor 921. As an example, the car navigation device 920 may be equipped with a module including a part (for example, the BB processor 934) or all of the wireless communication interface 933 and/or the processor 921, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the car navigation device 920 and executed by the wireless communication interface 933 (for example, the BB processor 934) and/or the processor 921. As described above, the car navigation device 920 or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 220 described with reference to FIG. 13 may be implemented in the wireless communication interface 933 (for example, the RF circuit 935) in the car navigation device 920 shown in FIG. 29. In addition, the antenna unit 210 may be implemented on the antenna 937. Furthermore, the storage unit 230 may be implemented in the memory 922.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

3. CONCLUSION

According to the embodiment of the present disclosure as described above, it is possible to provide the base station device 100 and the terminal device 200 capable of transmitting the PUCCH when LBT failure occurs, and thereby use resources efficiently in an NR-U.

It is possible to create a computer program for causing hardware such as a CPU, ROM, and RAM built into each device to exhibit functions that are substantially the same as the configuration of each device described above. Further, it is also possible to provide a storage medium having the computer program stored therein. Additionally, by configuring each of the function blocks illustrated in the function block diagrams as hardware, the series of processes may also be achieved by hardware.

The preferred embodiment(s) of the present disclosure has/have been described above with reference to the accompanying drawings, whilst the present disclosure is not limited to the above examples. A person skilled in the art may find various alterations and modifications within the scope of the technical idea described in the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)

A wireless communication device including:

a determination unit configured to determine whether a channel is clear or busy; and a transmission processing unit configured to transmit a hybrid ARQ (HARQ) to a communication device of a communication partner, in which the HARQ is transmitted using a first resource or a second resource, and in a case where transmission of the HARQ using the first resource has been failed through the determination by the carrier sense unit, the transmission processing unit transmits a HARQ using the second resource.

(2)

The wireless communication device according to (1), in which the first resource is set with DCI, and the second resource is set through RRC signaling.

(3)

The wireless communication device according to (2), in which a plurality of the second resources is set.

(4)

The wireless communication device according to (2), in which a plurality of resources which is different in a time domain is set as the second resource.

(5)

The wireless communication device according to (2), in which a plurality of resources which is different in a frequency domain is set as the second resource.

(6)

The wireless communication device according to any one of (1) to (5), in which the first resource is set with DCI, and the second resource is set with DCI different from the DCI.

(7)

The wireless communication device according to (6), in which the second resource has a structure of a PUCCH or a PUSCH.

(8)

The wireless communication device according to (7), in which the second resource includes UCI.

(9)

The wireless communication device according to (8), in which a grant of the UCI includes a DL HARQ process ID.

(10)

The wireless communication device according to any one of (1) to (9), in which in a case where transmission of part of a response of a HARQ has been failed, the transmission processing unit transmits a response of another HARQ into which at least part of the response of the HARQ for which transmission has been failed is mixed.

(11)

The wireless communication device according to (10), in which in a case where there is a plurality of responses of HARQs for which transmission has been partially failed, the transmission processing unit prefentially transmits the response of the HARQ corresponding to a PDSCH which has been transmitted first.

(12)

The wireless communication device according to (10), in which in a case where there is a plurality of responses of HARQs for which transmission has been partially failed, the transmission processing unit preferentially transmits a response of a HARQ which is scheduled to be transmitted at that time point.

(13)

The wireless communication device according to any one of (1) to (9), in which in a case where part of a HARQ has been failed, the transmission processing unit discards data of the part of the HARQ for which transmission has been failed upon transmission of another HARQ and retransmits the data of the HARQ.

(14)

A wireless communication device including:

a communication unit configured to receive a hybrid ARQ (HARQ) from a communication device of a communication partner; and a setting unit configured to set a resource to be used by the communication device to transmit the HARQ, in which the setting unit sets a first resource or a second resource as the resource for transmitting the HARQ, and the second resource is a resource which transmits a HARQ in a case where the communication device has failed in transmission of the HARQ using the first resource.

(15)

The wireless communication device according to (14), in which the first resource is set with DCI, and the second resource is set through RRC signaling.

(16)

The wireless communication device according to (14), in which the first resource is set with DCI, and the second resource is set with DCI different from the DCI.

(17)

A wireless communication method including:

determining whether a channel is clear or busy; and transmitting a hybrid ARQ (HARQ) to a communication device of a communication partner, in which the HARQ is transmitted using a first resource or a second resource, and in a case where transmission of the HARQ using the first resource has been failed through the determination as to whether the channel is clear or busy, a HARQ is transmitted using the second resource.

(18)

A wireless communication method including:

setting a resource to be used by a communication device of a communication partner to transmit the HARQ; and receiving a hybrid ARQ (HARQ) from the communication device, in which a first resource or a second resource is set as the resource for transmitting the HARQ, and the second resource is a resource which transmits a HARQ in a case where the communication device has failed in transmission of the HARQ using the first resource.

(19)

A computer program for causing a computer to execute a process including:

determining whether a channel is clear or busy; and transmitting a hybrid ARQ (HARQ) to a communication device of a communication partner, in which the HARQ is transmitted using a first resource or a second resource, and in a case where transmission of the HARQ using the first resource has been failed through the determination as to whether the channel is clear or busy, a HARQ is transmitted using the second resource.

(20)

A computer program for causing a computer to execute a process including:

setting a resource to be used by a communication device of a communication partner to transmit a hybrid ARQ (HARQ); and receiving the HARQ from the communication device, in which a first resource or a second resource is set as the resource for transmitting the HARQ, and the second resource is a resource which transmits a HARQ in a case where the communication device has failed in transmission of the HARQ using the first resource.

REFERENCE SIGNS LIST

100 Base station device
200 Terminal device

The invention claimed is:

1. A wireless communication device configured to operate as a user equipment and comprising:

a transceiver; and processing circuitry configured to:

determine a status of a channel for receiving a first physical downlink control channel (PDCCH) and a first physical downlink shared channel (PDSCH);

upon determining that the channel for receiving the first PDCCH and the first PDSCH is not busy, receive the first PDCCH and the first PDSCH from a base station (BS), the first PDCCH including a schedule for a first uplink resource to be used for transmitting a hybrid ARQ (HARQ) relative to the first PDCCH;

determine a status of a channel for transmitting the HARQ relative to the first PDCCH via the scheduled first uplink resource;

upon determining that the status of the channel for transmitting the HARQ relative to the first PDCCH is busy, not transmit the HARQ relative to the first PDCCH;

after not transmitting the HARQ relative to the first PDCCH, receive a second PDCCH from the BS without receiving a retransmission of the PDSCH, the second PDCCH including a schedule for one or more second uplink resources to be used for the HARQ relative to the second PDCCH;

determine a status of a channel for transmitting the HAW) relative to the second PDCCH to the BS via one of the one or more second uplink resources;

upon determining that the channel fir transmitting the HARQ relative to the second PDCCH is not busy, transmit the HARQ relative to the second PDCCH to the BS via the one of the one or more second uplink resources, wherein the HARQ relative to the second PDCCH includes at least a part of the HARQ relative to the first PDCCH, wherein the scheduled one of one or more second uplink resources comprises a mini slot to be used for the part of the HARQ relative to the first PDCCH, the mini slot being a time domain in which a physical channel of a slot is transmitted without transmitting a head portion of the slot, wherein the first uplink resource is a resource for a first physical uplink control channel (PUCCH) and the one or more second uplink resources comprises a resource for a second PUCCH or a resource for a physical uplink shared channel (PUSCH).

2. The wireless communication device according to claim 1, wherein the first uplink resource is set by the BS with Downlink Control Information (DCI), and the one or more second uplink resources is set by the BS through RRC signaling.

3. The wireless communication device according to claim 2, wherein the one or more second uplink resources is one of a plurality of uplink resources set by the BS through the RRC signaling.

4. The wireless communication device according to claim 2, wherein a plurality of resources which differ in a lime domain is set by the BS through the RRC signaling as the one or more second uplink resources.

5. The wireless communication device according to claim 2, wherein a plurality of resources which differ in a frequency domain is se by the BS through the RRC signaling as the one or more second uplink resources.

6. The wireless communication device according to claim 1, wherein the first uplink resource is set by the BS with a first DCI, and the one or more second uplink resources is set by the BS with a second DCI different from the first DCI.

7. The wireless communication device according to claim 1, wherein, after transmitting, to the BS, the HARQ relative to the second PDCCH, the processing circuitry is further configured to:

receive a second PDSCH without determining whether a channel for receiving the second PDSCH is clear or busy, and transmit a HARQ relative to the second PDSCH via a third PUCCH without determining whether a channel for the to-be-transmitted HARQ relative to the second PDSCH is clear or busy.

8. The wireless communication device according to claim 1, wherein the PUSCH resource includes Uplink Control Information (UCI) for the PUSCH resource.

9. The wireless communication device according to claim 8, wherein a grant of the UCI for the PUSCH resource by the BS includes a downlink (DL) HARQ process identifier (ID) instead of an uplink HARQ process ID.

10. A wireless communication device configured to operate as a base station and comprising:

a transceiver; and processing circuitry configured to:

transmit a first PDCCH and a first PDSCH to a user equipment (UE), the first PDCCH including a schedule for a first uplink resource to be used by the UE for transmitting a hybrid ARQ (HARQ) relative to the first PDCCH, determine that the UE did not transmit the HARQ relative to the first PDCCH, wherein the UE does not transmit the HARQ relative to the first PDCCH upon a determination by the UE that a status of a channel for transmitting the HARQ relative to the first PDCCH is busy, after determining that the UE did not transmit the HARQ relative to the first PDCCH, transmit a second PDCCH to the UE without retransmitting the PDSCH, the second PDCCH including a schedule for one or more second uplink resources to be used by the UE for transmitting a HARQ relative to the second PDCCH; and receive the HARQ relative to the second PDCCH from the UE via the one or more second uplink resources, wherein the UF, transmits the HARQ relative to the second PDCCH upon a determination by the UE that a status of a channel for transmitting the HARQ relative to the second PDCCH is not busy;

wherein the HARQ relative to the second PDCCH includes at least a part of the HARQ relative to the first PDCCH, wherein the scheduled one or more second uplink resources comprises a mini slot to be used by the UE for the part of the HARQ relative to the first PDCCH, the mini slot being a time domain in which a physical channel of a slot is transmitted without transmitting a head portion of the slot, wherein the first uplink resource is a resource for a first PUCCH, and the one or more second uplink resources comprises a resource for a second PUCCH or a resource for a PUSCH.

11. The wireless communication device according to claim 10, wherein the first uplink resource is set by the BS with Downlink Control Information (DCI), and the one or more second uplink resources is set by the BS through RRC signaling.

12. The wireless communication device according to claim 10, wherein the first uplink resource is set by the BS with a first DCI, and the one or more second uplink resources is set by the BS with a second DC1 different from the first DCI.

13. A wireless communication method performed by a wireless communication device configured to operate as a user equipment, the method comprising:

determining a status of a channel for receiving a first PDCCH and a first PDSCH;

upon determining that the channel for receiving the first PDCCH and the first PDSCH is not busy, receiving the first PDCCH and the first PDSCH from a base station (BS), the first PDCCH including a schedule for a first uplink resource to be used for transmitting a hybrid ARQ (HARQ) relative to the first PDCCH;

determining a status of a channel for transmitting the HARQ relative to the first PDCCH via the scheduled first PUCCH resource, upon determining that the status of the channel for transmitting the HARQ relative to the first PDCCH is busy, not transmitting the HARQ relative to the first PDCCH;

after not transmitting the HARQ relative to the first PDCCH, receiving a second PDCCH from the BS without receiving a retransmission of the PDSCH, the second PDCCH including a schedule for one or more second uplink resources to be used for the HARQ relative to the second PDCCH;

determining a status of a channel for transmitting the HARQ relative to the second PDCCH to the BS via the one or more second uplink resources;

upon determining that the channel for transmitting the HARQ relative to the second PDCCH is not transmitting the HARQ relative to the second PDCCH to the BS via the one or more second uplink resources, wherein the HARQ relative to the second PDCCH includes at least a part of the HARQ relative to the first PDCCH, wherein the scheduled one or more second uplink resources comprises a mini slot to be used for the part of the HARQ relative to the first PDCCH, the mini slot being a time domain in which a physical channel of a slot is transmitted without transmitting a head portion of the slot, wherein the first uplink resource is a resource for a first PUCCH, and the one or more second uplink resources comprises a resource for a second PUCCH or a resource for a PUSCH.

14. A wireless communication method performed by a wireless communication device configured to operate as a base station, the method comprising:

transmitting a first physical downlink control channel (PDCCH) and a first physical downlink shared channel (PDSCH) to a user equipment (UE), the first PDCCH including a schedule for a first uplink resource to be used by the UE for transmitting a hybrid ARQ (HARQ) relative to the first PDCCH;

determining that the UE did not transmit the HARQ relative to the first PDCCH, wherein the UE does not transmit the HARQ relative to the first PDCCH upon a determination by the UE that a status of a channel for transmitting the HARQ relative to the first PDCCH is busy, after determining that the UE did not transmit the HARQ relative to the first PDCCH, transmitting a second PDCCH to the UE without retransmitting the PDSCH, the second PDCCH including a schedule for one or more second uplink resources to be used by the UE fax transmitting a HARQ relative to the second PDCCH; and receiving the HARQ relative to the second PDCCH from the UE via the one or more second uplink resources, wherein the UE transmits the HARQ relative to the second PDCCH upon a determination by the UE that a status of a channel for transmitting the HARQ relative to the second PDCCH is not busy, wherein the HARQ relative to the second PDCCH includes at least a part of the HARQ relative to the first PDCCH, wherein the scheduled one or more second uplink resources comprises a mini slot to be used by the UE for the part of the HARQ relative to the first PDCCH, the mini slot being a time domain in which a physical channel of a slot is transmitted without transmitting a head portion of the slot, wherein the first uplink resource is a resource for a first physical uplink control channel (PUCCH), and the one or more second uplink resources comprises a resource for a second PUCCH or a resource for a physical uplink shared channel (PUSCH).

15. A non-transitory computer readable product containing a computer program for causing a computer to execute a process comprising:

determining a status of a channel for receiving a first PDCCH and a first PDSCH;

upon determining that the channel for receiving the first PDCCH and the first PDSCH is not busy, receiving the first PDCCH and the first PDSCH from a base station (BS), the first PDCCH including a schedule for a first uplink resource to be used for transmitting a hybrid ARQ (HARQ) relative to the first PDCCH;

determining a status of a channel for transmitting the HARQ relative to the first PDCCH via the scheduled first PUCCH resource, upon determining that the status of the channel for transmitting the HARQ relative to the first PDCCH is busy, not transmitting the HARQ relative to the first PDCCH;

after not transmitting the HARQ relative to the first PDCCH, receiving a second PDCCH from the BS without receiving a retransmission of the PDSCH, the second PDCCH including a schedule for one or more second uplink resources to be used for the HARQ relative to the second PDCCH;

determining a status of a channel for transmitting the HARQ relative to the second PDCCH to the BS via the one or more second uplink resources;

upon determining that the channel for transmitting the HARQ relative to the second PDCCH is not busy, transmitting the HARQ relative to the second PDCCH to the BS via the one or more second uplink resources, wherein the HARQ relative to the second PDCCH includes at least a part of the HARQ relative to the first PDCCH, wherein the scheduled one or more second uplink resources comprises a mini slot to be used for the part of the HARQ relative to the first PDCCH, the mini slot being a time domain in which a physical channel of a slot is transmitted without transmitting a head portion of the slot, wherein the first uplink resource is a resource for a first PUCCH, and the one or more second uplink resources comprises a resource for a second PUCCH or a resource for a PUSCH.

16. A non-transitory computer readable product containing a computer program for causing a computer to execute a process comprising:

transmitting a first physical downlink control channel (PDCCH) and a first physical downlink shared channel (PDSCH) to a user equipment (UE), the first PDCCH including a schedule for a first uplink resource to be used by the UE for transmitting a hybrid ARQ (HARQ) relative to the first PDCCH;

determining that the UE did not transmit the HARQ relative to the first PDCCH, wherein the UE does not transmit the HARQ relative to the first PDCCH upon a determination by the UE that a status of a channel for transmitting the HARQ relative to the first PDCCH is busy, after determining that the UE did not transmit the HARQ relative to the first PDCCH, transmitting a second PDCCH to the UE without retransmitting the PDSCH, the second PDCCH including a schedule for one or more second uplink resources to be used by the UE for transmitting a HARQ relative to the second PDCCH; and receiving the HARQ relative to the second PDCCH from the UE via the one or more second uplink resources, wherein the UE transmits the HARQ relative to the second PDCCH upon a determination by the UE that a status of a channel for transmitting the HARQ relative to the second PDCCH is not busy, wherein the HARQ relative to the second PDCCH includes at least a part of the HARQ relative to the first PDCCH, wherein the scheduled one or more second uplink resources comprises a mini slot to be used by the UE for the part of the HARQ relative to the first PDCCH, the mini slot being a time domain in which a physical channel of a slot is transmitted without transmitting a head portion of the slot, wherein the first uplink resource is a resource for a first physical uplink control channel (PUCCH), and the one or more second uplink resources comprises a resource for a second PUCCH or a resource for a physical uplink shared channel (PUSCH).

* * * * *